US012335056B2

(12) United States Patent
Jonsson et al.

(10) Patent No.: US 12,335,056 B2
(45) Date of Patent: Jun. 17, 2025

(54) ENERGY EFFICIENT ETHERNET (EEE) OPERATION

(71) Applicant: Marvell Asia Pte Ltd, Singapore (SG)

(72) Inventors: Ragnar Hlynur Jonsson, Aliso Viejo, CA (US); Brian Edem, Saratoga, CA (US); Brett Anthony McClellan, Laguna Hills, CA (US); Seid Alireza Razavi Majomard, Belmont, CA (US); Xing Wu, Palo Alto, CA (US); George Zimmerman, Manhattan Beach, CA (US)

(73) Assignee: Marvell Asia Pte Ltd, Singapore (SG)

( * ) Notice: Subject to any disclaimer, the term of this patent is extended or adjusted under 35 U.S.C. 154(b) by 67 days.

(21) Appl. No.: 18/201,135

(22) Filed: May 23, 2023

(65) Prior Publication Data
US 2023/0353395 A1    Nov. 2, 2023

Related U.S. Application Data

(63) Continuation-in-part of application No. 18/142,491, filed on May 2, 2023.
(Continued)

(51) Int. Cl.
*G06F 1/26* (2006.01)
*H04L 7/00* (2006.01)
(Continued)

(52) U.S. Cl.
CPC ............ *H04L 12/12* (2013.01); *H04L 7/0079* (2013.01); *G06F 1/3203* (2013.01)

(58) Field of Classification Search
CPC .................................................... G06F 1/3206
(Continued)

(56) References Cited

U.S. PATENT DOCUMENTS 8,169,893 B1 * 5/2012 Getker .................... H04L 45/22
709/228
9,207,740 B2 * 12/2015 Manav .................. G06F 1/3209
(Continued)

FOREIGN PATENT DOCUMENTS

EP        3860045 A1 *  8/2021  ........... G06F 1/3209

OTHER PUBLICATIONS

Axer et al., "802.3bp Sleep/Wake-up Specification—TC10—OPEN Sleep/Wake-up Specification for Automotive Gigabit Ethernet," OPEN Alliance, Jul. 28, 2021 (23 pages).
(Continued)

*Primary Examiner* — Volvick Derose

(57) ABSTRACT

A network interface device operates in a normal transmit operating mode in which the network interface device continually receives transmission symbols from a link partner via the communication link. The network interface device determines that receive circuitry of the network interface device is to transition to a low power mode in response to receiving a sleep signal from the link partner. The network interface device then operates according to a quiet/refresh cycle of the low power mode to conserve power. The quiet/refresh cycle corresponds to a time schedule that includes a refresh time window in which receive circuitry of the network interface device is to be powered to receive a refresh signal from the link partner Immediately after transmission of the sleep signal, the network interface device transitions to a quiet time window of the time schedule in which the network interface device ignores transmissions from the link partner.

20 Claims, 9 Drawing Sheets

Related U.S. Application Data

(60) Provisional application No. 63/344,730, filed on May 23, 2022, provisional application No. 63/337,235, filed on May 2, 2022, provisional application No. 63/337,240, filed on May 2, 2022.

(51) Int. Cl.
  *H04L 12/12* (2006.01)
  *G06F 1/3203* (2019.01)

(58) Field of Classification Search
  USPC .......................................................... 713/320
  See application file for complete search history.

(56) References Cited

U.S. PATENT DOCUMENTS

| | | | | |
|---|---|---|---|---|
| 2009/0204836 | A1* | 8/2009 | Diab | H04L 12/12 713/323 |
| 2010/0262844 | A1* | 10/2010 | Diab | G06F 1/3209 713/300 |
| 2011/0246798 | A1* | 10/2011 | Bilgin | G06F 1/3203 709/202 |
| 2014/0010130 | A1* | 1/2014 | Diab | H04L 12/12 370/296 |
| 2014/0112663 | A1* | 4/2014 | Diab | H04B 10/27 398/58 |
| 2017/0038970 | A1* | 2/2017 | Ishiguro | G06F 1/3209 |
| 2017/0118708 | A1* | 4/2017 | Alon | H04W 52/0212 |
| 2019/0129630 | A1* | 5/2019 | Erez | G06F 3/0688 |
| 2019/0129636 | A1* | 5/2019 | Benisty | G06F 3/0634 |
| 2019/0364500 | A1* | 11/2019 | Sambhwani | H04W 52/0216 |
| 2021/0328819 | A1 | 10/2021 | Benyamin et al. | |
| 2022/0077879 | A1* | 3/2022 | Husain | H04B 1/0003 |
| 2022/0216978 | A1* | 7/2022 | Fitzgerald | H04L 12/12 |

OTHER PUBLICATIONS

International Search Report and Written Opinion for International Application No. PCT/US2023/023281, mailed Jul. 13, 2023. (15 pages).
Jonsson et al., "Clarify EEE Quiet Signaling—Contribution to IEEE 802.3cy," available at https://www.ieee802.org/3/cy/public/adhoc/jonsson_majomard_3cy_01_05_03_22.pdf, May 3, 2022 (6 pages).
Jonsson et al., "Design Considerations for EEE—Contribution to IEEE 802.3cy," available at https://www.ieee802.org/3/cy/public/adhoc/jonsson_majomard_3cy_01_04_05_22.pdf, Apr. 5, 2022 (10 pages).
Jonsson et al., "Text Proposal for EEE Quiet Signalling—Contribution to IEEE 802.3cy," available at https://www.ieee802.org/3/cy/public/may22/jonsson_zimmerman_majomard_3cy_01a_05_17_22.pdf, (7 pages).
Zimmerman, "EEE Scenarios for Automotive Links," available at https://www.ieee802.org/3/cy/public/adhoc/zimmerman_3cy_01_12_07_21.pdf, Dec. 2, 2021 (11 pages).
Zimmerman, "Energy Efficient Ethernet, Wake Signals and Deep Sleep for Automotive Ethernet," available at https://www.ieee802.org/3/ch/public/jul17/zimmerman_3ch_02a_0717.pdf, Jul. 2017 (16 pages).
"IEEE Std 802.3chTM-2020, Amendment 8: Physical Layer Specifications and Management Parameters for 2.5 Gb/s, 5 Gb/s, and 10 Gb/s Automotive Electrical Ethernet," The Institute for Electrical and Electronics Engineers (IEEE), Jun. 4, 2020 (207 pages).
Non-Final Office Action for U.S. Appl. No. 18/142,491, mailed Sep. 9, 2024. (9 pages).

\* cited by examiner

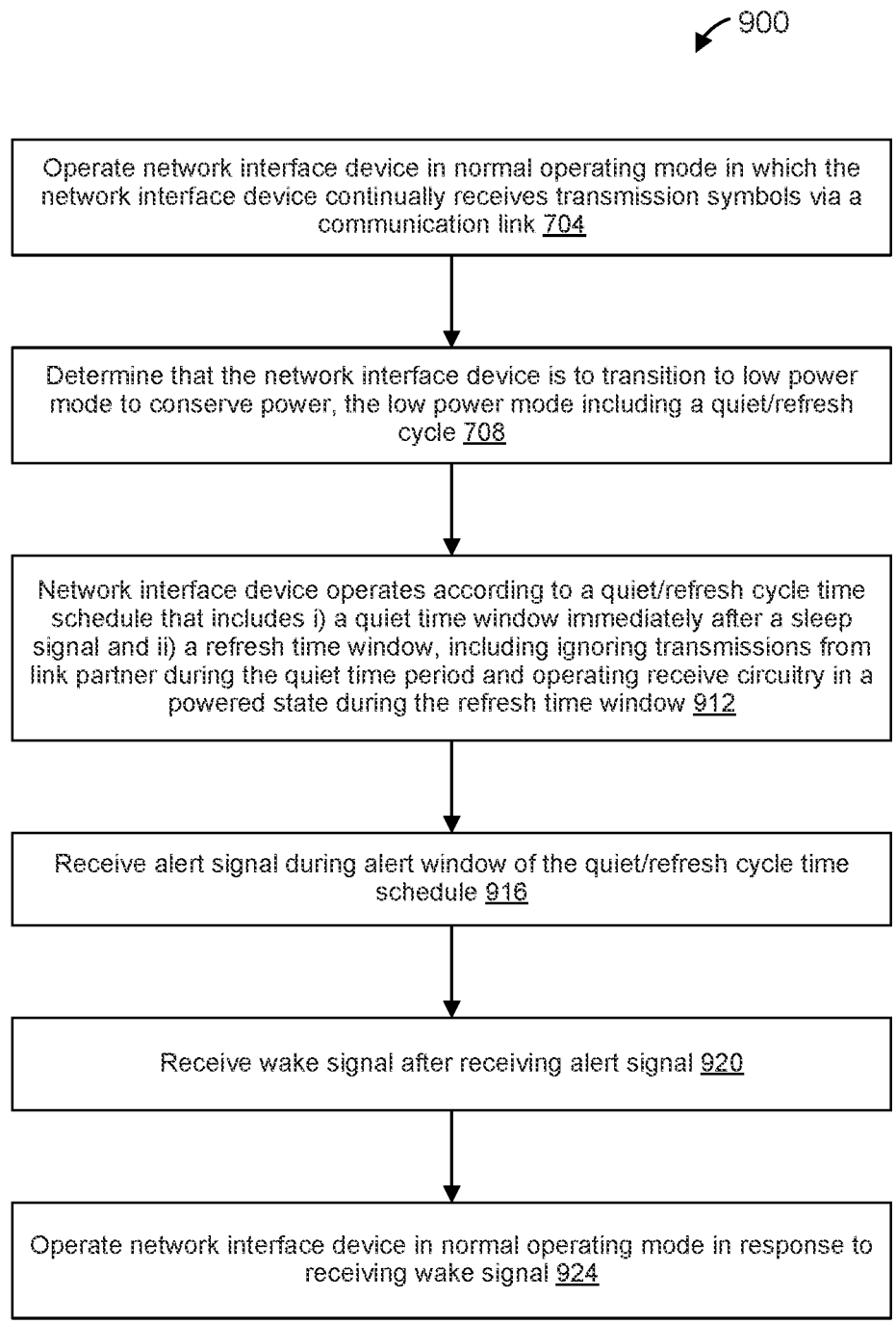

ENERGY EFFICIENT ETHERNET (EEE) OPERATION

CROSS REFERENCES TO RELATED APPLICATIONS

This application claims the benefit of U.S. Provisional Patent App. No. 63/344,730, entitled "Energy Efficient Ethernet (EEE) Low Power Idle (LPI) Signaling," filed on May 23, 2022. Additionally, this application is a continuation-in-part of U.S. patent application Ser. No. 18/142,491, entitled "Improved Energy Efficient Ethernet (EEE) Operation," filed on May 2, 2023, which claims the benefit of U.S. Provisional Patent App. No. 63/337,235, entitled "Revisit Alert Signaling," filed on May 2, 2022, and U.S. Provisional Patent App. No. 63/337,240, entitled "Energy Efficient Ethernet (EEE) Quiet Signaling Clarification," filed on May 2, 2022. All of the applications referenced above are incorporated herein by reference in their entireties.

FIELD OF TECHNOLOGY

The present disclosure relates generally to communication technology, and more particularly to power saving techniques for communications.

BACKGROUND

The IEEE 802.3Ch™ Standard, *Institute for Electrical and Electrical Engineers (IEEE)*, pp. 1-207, Jun. 30, 2020 ("IEEE Std 802.3Ch™-2020"), describes a feature, referred to as Energy Efficient Ethernet (EEE), that reduces power consumption during periods in which a transmitter does not need to transmit data. For example, when the transmitter does not need to transmit data via a communication link, the transmitter transitions the communication link from a normal operation mode to a low power idle (LPI) mode of operation. During the LPI mode, the transmitter and a link partner receiver operate in a repeating quiet-refresh cycle in which the transmitter transmits nothing during periodic time periods (referred to as "quiet time periods"), and transmits refresh symbols during other periodic time periods (referred to as "refresh time periods"). Because nothing is transmitted during the quiet time periods, power consumption is reduced at the transmitter. Similarly, the link partner receiver may also go to sleep during the quiet time periods to reduce power consumption. Transmission of the refresh symbols during the refresh time periods permits the link partner receiver to maintain clock synchronization and to adapt filters (e.g., equalization filters) of the receiver. The LPI includes multiple repeating quiet/refresh cycles, where each quiet/refresh cycle includes a quiet time period and a refresh time period. During the quiet period, a leader device does not transmit (according to an embodiment), whereas during the refresh period, the leader device transmits a refresh signal comprising refresh symbols. A follower device receives the refresh signal during the refresh time period and uses the refresh symbols to synchronize to the timing of the leader device and adjust adaptive filters of the follower device. The quiet time period is significantly longer than the refresh time period, and thus power consumption during the quiet/refresh cycle is significantly reduced as compared to normal operation.

The quiet/refresh cycle includes designated windows (referred to herein as "alert time windows") in which the leader device may transmit a signal (referred to herein as an "alert signal") that warns the follower device that the leader device will soon transmit a wake signal, where the wake signal is a request to exit the LPI mode. When in the LPI mode, the follower device is configured to power up (at least some receiver circuitry) to be prepared to receive an alert signal in any of the alert time windows. The follower device, in response to receiving an alert signal in an alert time window, keeps at least some receiver circuitry powered up in anticipation of receiving a wake signal. In response to receiving the wake signal, the follower device receiver exits the LPI mode. When in the LPI mode, the follower device is configured to power down (at least some) receive circuitry when outside of the alert time windows. Similarly, when in the LPI mode, the leader device is configured to power down (at least some) transmit circuitry during the quiet time period unless the leader device determines to exit the LPI mode, in which case the leader device powers up the transmit circuitry to transmit an alert signal during one of the alert time windows.

The LPI mode described above also can be independently performed in a reverse direction from the follower device to the leader device. In other words, a forward link from the leader device to the follower device can operate in the LPI mode independently from the reverse link from the follower device to the leader device, and vice versa.

SUMMARY

In an embodiment, a network interface device comprises: physical layer (PHY) circuitry that includes a transceiver, the PHY processor being configured to perform PHY functions associated with a communication link. The network interface also comprises a controller. The controller is configured to: operate the PHY circuitry in a normal receive operating mode in which the PHY circuitry continually receives transmission symbols from a link partner via the communication link; determine that receive circuitry of the PHY circuitry is to transition to a low power mode in response to receiving a sleep signal from the link partner; and in response to determining that the receive circuitry is to transition to the low power mode and after receiving the sleep signal, control the PHY circuitry to operate according to a quiet/refresh cycle of the low power mode to conserve power, the quiet/refresh cycle corresponding to a time schedule that includes a refresh time window in which receive circuitry of the PHY circuitry is to be powered to receive a refresh signal from the link partner to facilitate keeping the receive circuitry of PHY circuitry synchronized with the link partner, including controlling the PHY circuitry to transition, immediately after transmission of the sleep signal, to a quiet time window of the time schedule in which the PHY circuitry ignores transmissions from the link partner.

In another embodiment, a method for power saving regarding a communication link includes: operating a network interface device in a normal transmit operating mode in which the network interface device continually receives transmission symbols from a link partner via the communication link; determining, at the network interface device, that receive circuitry of the network interface device is to transition to a low power mode in response to receiving a sleep signal from the link partner; in response to determining that the receive circuitry is to transition to the low power mode and after receiving the sleep signal, operating the network interface device according to a quiet/refresh cycle of the low power mode to conserve power, the quiet/refresh cycle corresponding to a time schedule that includes a refresh time window in which receive circuitry of the network interface device is to be powered to receive a refresh signal from the link partner to facilitate keeping the receive circuitry of the network interface device synchronized with the link partner, including transitioning, immediately after transmission of the sleep signal, the network interface device to a quiet time window of the time schedule in which the network interface device ignores transmissions from the link partner.

In yet another embodiment, a network interface device comprises: PHY circuitry that includes a transceiver, the PHY processor being configured to perform PHY functions associated with a communication link. The network interface also comprises a controller. The controller is configured to: operate the PHY circuitry in a normal transmit operating mode in which the PHY circuitry continually transmits transmission symbols to a link partner via the communication link; determine that transmit circuitry of the PHY circuitry is to transition to a low power mode; in response to determining that the transmit circuitry is to transition to the low power mode, transmit a sleep signal to the link partner via the communication link to prompt the link partner to enter the low power mode; and in response to determining that the transmit circuitry is to transition to the low power mode and after transmitting the sleep signal, control the PHY circuitry to operate according to a quiet/refresh cycle to conserve power, the quiet/refresh cycle corresponding to a time schedule that includes a refresh time window in which the PHY circuitry is to transmit a refresh signal to the link partner to facilitate keeping the receive circuitry of the link partner synchronized with the PHY circuitry, including controlling the PHY circuitry to transition, immediately after transmission of the sleep signal, to a quiet time window of the time schedule in which the PHY circuitry quiets transmissions to the link partner.

In still another embodiment, a method for power saving regarding a communication link includes: operating a network interface device in a normal transmit operating mode in which the network interface device continually transmits transmission symbols to a link partner via the communication link; determining, at the network interface device, that transmit circuitry of the network interface device is to transition to a low power mode; in response to determining that the transmit circuitry is to transition to the low power mode; transmitting, by the network interface device, a sleep signal to the link partner via the communication link to prompt the link partner to enter the low power mode; and in response to determining that the transmit circuitry is to transition to the low power mode and after transmitting the sleep signal, operating the network interface device according to a quiet/refresh cycle to conserve power, the quiet/refresh cycle corresponding to a time schedule that includes a refresh time window in which the network interface device is to transmit a refresh signal to the link partner to facilitate keeping the receive circuitry of the link partner synchronized with the network interface device, including transitioning the network interface device immediately, after transmission of the sleep signal, to a quiet time window of the time schedule in which the transmit circuitry quiets transmissions to the link partner.

BRIEF DESCRIPTION OF THE DRAWINGS

FIG. 9 is a flow diagram of another example method for power saving regarding a communication link, according to another embodiment.

DETAILED DESCRIPTION

According to the Energy Efficient Ethernet (EEE) mechanism defined by the IEEE 802.3Ch™ Standard, *Institute for Electrical and Electrical Engineers (IEEE)*, pp. 1-207, Jun. 30, 2020 ("IEEE Std 802.3Ch™-2020"), the quiet/refresh cycle of the low power idle (LPI) mode begins with an alert time window. Therefore, immediately following a sleep signal from a leader device, a follower device enters the quiet/refresh cycle and must keep its receiver circuitry powered on to listen for an alert signal from the leader device. However, as the leader device shuts down transmitter circuitry after transmitting the sleep signal, there may be glitches and/or transitory signals transmitted on the communication link after the sleep signal. Because the receiver circuitry of the follower device is powered up to listen for an alert signal from the leader device immediately after the sleep signal, the follower device may interpret the glitches and/or transitory signals as an alert signal, which may lead to unpredictable behavior of the follower device and/or increased power consumption by the follower device.

In an embodiment, a time schedule of a quiet/refresh cycle includes alternating quiet time windows and alert time windows, with the quiet/refresh cycle starting with a quiet time window. As a result, after the follower device receives a sleep signal from a leader device, the follower device immediately transitions to a quiet time window in which the follower device ignores signals received via the communication link. Because the follower device immediately transitions to the quiet time window and ignores signals received via the communication link immediately after reception of the sleep signal ends, any glitches and/or transitory signals on the communication link after the sleep signal are ignored by the follower device.

Figure 1:
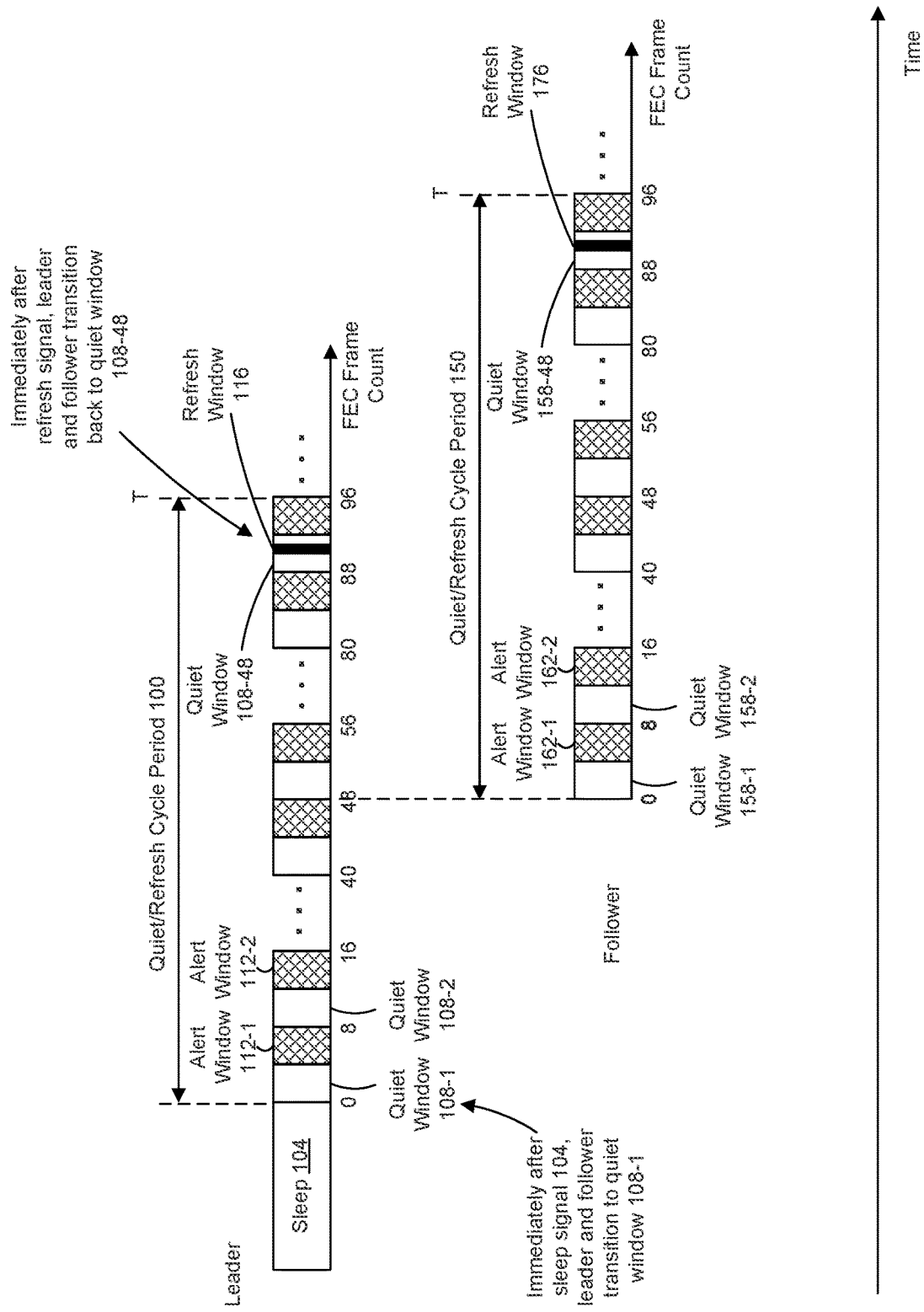
FIG. 1 is a timing diagram of an example quiet/refresh cycle period of a low power mode that enables power saving regarding a communication link, according to an embodiment.

FIG. 1 is a timing diagram of an example quiet/refresh cycle period 100 of a low power mode, according to an embodiment. The quiet/refresh cycle period 100 corresponds to a communication link from a leader communication device (sometimes referred to herein as the "leader") to a follower communication device (sometimes referred to herein as the "follower"), and is initiated by the leader transmitting a sleep signal 104 to the follower. The quiet/ refresh cycle period 100 is sometimes referred to herein as the "leader quiet/refresh cycle period 100".

The leader quiet/refresh cycle period 100 has a suitable duration T, and begins immediately after transmission of the sleep signal 104 by the leader device ends. The leader quiet/refresh cycle period 100 repeats until the leader decides to transition to a normal mode of operation, according to an embodiment.

The leader quiet/refresh cycle period 100 includes quiet time windows 108, alert time windows 112, and a refresh time window 116 that are ordered according to a time schedule. The quiet time windows 108 alternate in time with the alert time windows 112.

A clock of the follower is synchronized to a clock of the leader, and transmissions between the leader and the follower are aligned with time slots that correspond to forward error correction (FEC) coding codewords, i.e., each time slot corresponds to a time required to transmit an FEC coding codeword. The time slots are sometimes referred to herein as FEC frames.

The leader quiet/refresh cycle period 100 has a time duration of 96 FEC frames, i.e., T=96 FEC frames. In other embodiments, the leader quiet/refresh cycle period 100 has another suitable time duration.

Each of the quiet time windows 108, the alert time windows 112, and the refresh time window 116 begins on an FEC frame boundary and ends on an FEC frame boundary. Each of the quiet time windows 108 and the alert time windows 112 has a time duration of four FEC frames. In other embodiments, each of the quiet time windows 108 and the alert time windows 112 has another suitable time duration. The refresh time window 116 has a time duration of one FEC frame. In other embodiments, the refresh time window 116 has another suitable time duration.

During the quiet time windows 108, the leader quiets transmissions on the communication link and is permitted to shut down at least some transmit circuitry to conserve power. Therefore, in some embodiments, the leader shuts down at least some transmit circuitry during the quiet time windows 108 to conserve power. Similarly, the follower ignores transmissions on the communication link during the quiet time windows 108 and is permitted to shut down at least some receive circuitry to conserve power. Therefore, in some embodiments, the follower shuts down at least some receive circuitry during the quiet time windows 108 to conserve power.

During the alert time windows 112, when the leader has decided to remain in the low power mode, the leader quiets transmissions on the communication link and is permitted to shut down at least some transmit circuitry to conserve power. Therefore, in some embodiments, when the leader has decided to remain in the low power mode, the leader shuts down at least some transmit circuitry during the quiet time windows 108 to conserve power.

On the other hand, in response to the leader deciding to exit the low power mode, the leader controls transmit circuitry of the leader to be powered up during a next-occurring alert time window 112 and transmits, during the next-occurring alert time window 112, a signal that indicates to the follower that the leader is exiting the low power mode. For example, in an embodiment, the leader transmits, during the next-occurring alert time window 112, an alert signal that warns the follower that the leader will soon transmit a wake signal, where the wake signal is a request to exit the low power mode. Thus, the signal that indicates to the follower that the leader is exiting the low power mode comprises the alert signal, according to an embodiment. In another embodiment, the leader transmits, during the next-occurring alert time window 112, the wake signal without first transmitting the alert signal, i.e., transmission of the alert signal is not performed, and the leader transmits the wake signal during the next-occurring alert time window 112 without first transmitting the alert signal during the next-occurring alert time window 112. Thus, the signal that indicates to the follower that the leader is exiting the low power mode comprises the wake signal and omits the alert signal discussed above, according to an embodiment.

During the alert time windows 112, the follower is prepared to receive the signal that indicates the leader is exiting the low power mode. Thus, the follower controls the receive circuitry to be powered up during the alert time windows 112. In an embodiment in which the leader transmits an alert signal prior to transmitting a wake signal, the follower device, in response to receiving an alert signal in an alert time window 112, keeps the receive circuitry powered up in anticipation of receiving the wake signal, according to an embodiment. In response to receiving the wake signal, the follower device exits the low power mode.

In response to i) the follower not receiving, during the alert time window 112, the signal that indicates the leader is exiting the low power mode and ii) beginning a following quiet time window 108, the follower ignores transmissions on the communication link during the quiet time window 108 and is permitted to shut down at least some receive circuitry to conserve power, as discussed above.

The leader quiet/refresh cycle period 100 begins with the quiet time window 108-1. Therefore, the leader and the follower both transition to the quiet time window 108-1 immediately after transmission of the sleep signal 104 ends. Because the follower is in the quiet time window 108-1, any glitches and/or transitory signals on the communication link after the sleep signal 104 are ignored by the follower. Thus, the follower will not inadvertently interpret the glitches and/or transitory signals on the communication link as a signal that indicates the leader is exiting the low power mode, and thus unpredictable behavior resulting from such an inadvertent interpretation of the glitches and/or transitory signals is avoided.

The refresh time window 116 is within a last-occurring quiet time window 108-48 of the leader quiet/refresh cycle period 100. In an embodiment, the last-occurring quiet time window 108-48 includes a first-occurring FEC frame, a last-occurring FEC frame, and at least two middle-occurring FEC frames that are between the first-occurring FEC frame and the last-occurring FEC frame in time, and the refresh time window 116 is included within the at least two middle-occurring FEC frames. In an embodiment in which the last-occurring quiet time window 108-48 consists of four FEC frames, the refresh time window 116 is included within a third-occurring FEC frame. In another embodiment in which the last-occurring quiet time window 108-48 consists of four FEC frames, the refresh time window 116 is included within a second-occurring FEC frame. In another embodiment, the refresh time window 116 is included within the first-occurring FEC frame.

In an embodiment in which the quiet/refresh cycle period 100 has a length of 96 FEC frames, the refresh time window 116 corresponds to a 91st-occurring FEC frame within the quiet/refresh cycle period 100. In another embodiment in which the quiet/refresh cycle period 100 has a length of 96 FEC frames, the refresh time window 116 corresponds to a 90th-occurring FEC frame within the quiet/refresh cycle period 100.

During the quiet time window 108-48, the leader quiets transmissions on the communication link except during the refresh time window 116 and is permitted to shut down at least some transmit circuitry to conserve power except during the refresh time window 116. Therefore, in some embodiments, the leader shuts down at least some transmit circuitry during the quiet time window 108-48 to conserve power except during the refresh time window 116. During the refresh time window 116, the leader controls the transmit circuitry to be powered up and to transmit refresh signals to the follower to enable the follower to maintain clock synchronization with the leader and to adapt filters (e.g., equalization filters) of the follower.

Similarly, the follower ignores transmissions on the communication link during the quiet time window 108-48 except during the refresh time window 116 and is permitted to shut down at least some receive circuitry to conserve power except during the refresh time window 116. Therefore, in some embodiments, the follower shuts down at least some receive circuitry during the quiet time window 108-48 to conserve power except during the refresh time window 116. During the refresh time window 116, the follower controls the receive circuitry to be powered up and use the refresh signals from the leader to maintain clock synchronization with the leader and to adapt filters (e.g., equalization filters) of the follower.

At least one FEC frame of the quiet time window 108-48 follows the refresh time window 116. Therefore, the leader and the follower both transition to the at least one FEC frame of the quiet time window 108-48 immediately after transmission of the refresh signals end. Because the follower is in the quiet time window 108-48 after the transmission of the refresh signals end, any glitches and/or transitory signals on the communication link after the refresh signals are ignored by the follower. Thus, the follower will not inadvertently interpret the glitches and/or transitory signals on the communication link as a signal that indicates the leader is exiting the low power mode, and thus unpredictable behavior resulting from such an inadvertent interpretation of the glitches and/or transitory signals is avoided.

When the follower decides to transition a communication link from the follower to the leader to the low power mode, the follower transmits a sleep signal (not shown) to the leader and the communication link from the follower to the leader enters the low power mode. A quiet/refresh cycle period 150 corresponds to the low power mode of the communication link from the follower to the leader. The quiet/refresh cycle period 150 is sometimes referred to herein as the "follower quiet/refresh cycle period 150".

The follower quiet/refresh cycle period 150 is similar to the leader quiet/refresh cycle period 100, but is offset from the leader quiet/refresh cycle period 100 in time by approximately T/2. For example, a beginning of the follower quiet/refresh cycle period 150 is aligned with an end of a 48-th occurring FEC frame in the leader quiet/refresh cycle period 100, according to an embodiment. In other embodiments, the follower quiet/refresh cycle period 150 is offset from the leader quiet/refresh cycle period 100 in time by another suitable time offset.

The follower quiet/refresh cycle period 150 includes quiet time windows 158, alert time windows 162, and a refresh time window 176 that are ordered according to a time schedule. The quiet time windows 158 alternate in time with the alert time windows 162. Similar to the leader quiet/refresh cycle period 100, the refresh time window 176 occurs during a last-occurring quiet time windows 158-48, according to an embodiment.

The quiet time windows 158 are aligned, and coincide, in time with the quiet time windows 108, and the alert time windows 162 are aligned, and coincide, in time with the alert time windows 112. The refresh time window 176 is offset in time from the refresh time window 116 by approximately T/2. For example, the refresh time window 176 is offset in time from the refresh time window 116 by 48 FEC frames, according to an embodiment.

During the quiet time windows 158, the follower quiets transmissions on the communication link and is permitted to shut down at least some transmit circuitry to conserve power. Therefore, in some embodiments, the follower shuts down at least some transmit circuitry during the quiet time windows 158 to conserve power. Similarly, the leader ignores transmissions on the communication link during the quiet time windows 158 and is permitted to shut down at least some receive circuitry to conserve power. Therefore, in some embodiments, the leader shuts down at least some receive circuitry during the quiet time windows 158 to conserve power.

During the alert time windows 162, when the follower has decided to remain in the low power mode, the follower quiets transmissions on the communication link and is permitted to shut down at least some transmit circuitry to conserve power. Therefore, in some embodiments, when the follower has decided to remain in the low power mode, the follower shuts down at least some transmit circuitry during the quiet time windows 158 to conserve power.

On the other hand, in response to the follower deciding to exit the low power mode, the follower controls transmit circuitry of the leader to be powered up during a next-occurring alert time window 162 and transmits, during the next-occurring alert time window 162, a signal that indicates to the leader that the follower is exiting the low power mode. For example, in an embodiment, the follower transmits, during the next-occurring alert time window 162, an alert signal that warns the leader that the follower will soon transmit a wake signal, where the wake signal is a request to exit the low power mode. Thus, the signal that indicates to the leader that the follower is exiting the low power mode comprises the alert signal, according to an embodiment. In another embodiment, the follower transmits, during the next-occurring alert time window 162, the wake signal without first transmitting the alert signal, i.e., transmission of the alert signal is not performed, and the follower transmits the wake signal during the next-occurring alert time window 162 without first transmitting the alert signal during the next-occurring alert time window 162. Thus, the signal that indicates to the follower is exiting the low power mode comprises the wake signal and omits the alert signal discussed above, according to an embodiment.

During the alert time windows 162, the leader is prepared to receive the signal that indicates the follower is exiting the low power mode. Thus, the leader controls the receive circuitry to be powered up during the alert time windows 162. In an embodiment in which the follower transmits an alert signal prior to transmitting a wake signal, the leader, in response to receiving an alert signal in an alert time window 162, keeps the receive circuitry powered up in anticipation of receiving the wake signal, according to an embodiment. In response to receiving the wake signal, the leader exits the low power mode.

In response to i) the leader not receiving, during the alert time window 162, the signal that indicates the follower is exiting the low power mode and ii) beginning a following quiet time window 158, the leader ignores transmissions on the communication link during the quiet time window 158 and is permitted to shut down at least some receive circuitry to conserve power, as discussed above.

The leader and the follower both transition to a quiet time window 158 immediately after transmission of a sleep signal (not shown) ends. Because the leader is in the quiet time window 158, any glitches and/or transitory signals on the communication link after the sleep signal are ignored by the leader. Thus, the leader will not inadvertently interpret the glitches and/or transitory signals on the communication link as a signal that indicates the follower is exiting the low power mode, and thus unpredictable behavior resulting from such an inadvertent interpretation of the glitches and/or transitory signals is avoided.

The refresh time window 176 is within a last-occurring quiet time window 158-48 of the follower quiet/refresh cycle period 150. In an embodiment, the last-occurring quiet time window 158-48 includes a first-occurring FEC frame, a last-occurring FEC frame, and at least two middle-occurring FEC frames that are between the first-occurring FEC frame and the last-occurring FEC frame in time, and the refresh time window 176 is included within the at least two middle-occurring FEC frames. In an embodiment in which the last-occurring quiet time window 158-48 consists of four FEC frames, the refresh time window 176 is included within a third-occurring FEC frame. In another embodiment in which the last-occurring quiet time window 158-48 consists of four FEC frames, the refresh time window 176 is included within a second-occurring FEC frame. In another embodiment, the refresh time window 176 is included within the first-occurring FEC frame.

During the quiet time window 158-48, the follower quiets transmissions on the communication link except during the refresh time window 176 and is permitted to shut down at least some transmit circuitry to conserve power except during the refresh time window 176. Therefore, in some embodiments, the follower shuts down at least some transmit circuitry during the quiet time window 158-48 to conserve power except during the refresh time window 176. During the refresh time window 176, the follower controls the transmit circuitry to be powered up and to transmit refresh signals to the leader to enable the follower to maintain clock synchronization with the leader and to adapt filters (e.g., equalization filters) of the leader.

Similarly, the leader ignores transmissions on the communication link during the quiet time window 158-48 except during the refresh time window 176 and is permitted to shut down at least some receive circuitry to conserve power except during the refresh time window 176. Therefore, in some embodiments, the leader shuts down at least some receive circuitry during the quiet time window 158-48 to conserve power except during the refresh time window 176. During the refresh time window 176, the leader controls the receive circuitry to be powered up and use the refresh signals from the follower to adapt filters (e.g., equalization filters) of the leader.

At least one FEC frame of the quiet time window 158-48 follows the refresh time window 176. Therefore, the leader and the follower both transition to the at least one FEC frame of the quiet time window 158-48 immediately after transmission of the refresh signals end. Because the leader is in the quiet time window 158-48 after the transmission of the refresh signals end, any glitches and/or transitory signals on the communication link after the refresh signals are ignored by the leader. Thus, the leader will not inadvertently interpret the glitches and/or transitory signals on the communication link as a signal that indicates the follower is exiting the low power mode, and thus unpredictable behavior resulting from such an inadvertent interpretation of the glitches and/or transitory signals is avoided.

In some embodiments, transmissions between the leader and follower are aligned with time slots that correspond to a set of multiple FEC frames, and such time slots are referred to herein as FEC superframes. Each set of multiple FEC frames includes a predetermined number of FEC frames. For example, each FEC superframe includes a set of eight FEC frames, according to an embodiment. In other embodiments, each FEC superframe includes another suitable number of FEC frames. In some embodiments, when data is being transmitted in a normal transmission mode, data from the multiple FEC codewords within the set of multiple FEC frames are interleaved within the FEC superframe.

In some embodiments in which transmissions between the leader and follower are aligned with FEC superframes, the leader quiet/refresh cycle period 100 and the follower quiet/refresh cycle period 150 both start on an FEC superframe boundary.

Figure 2:
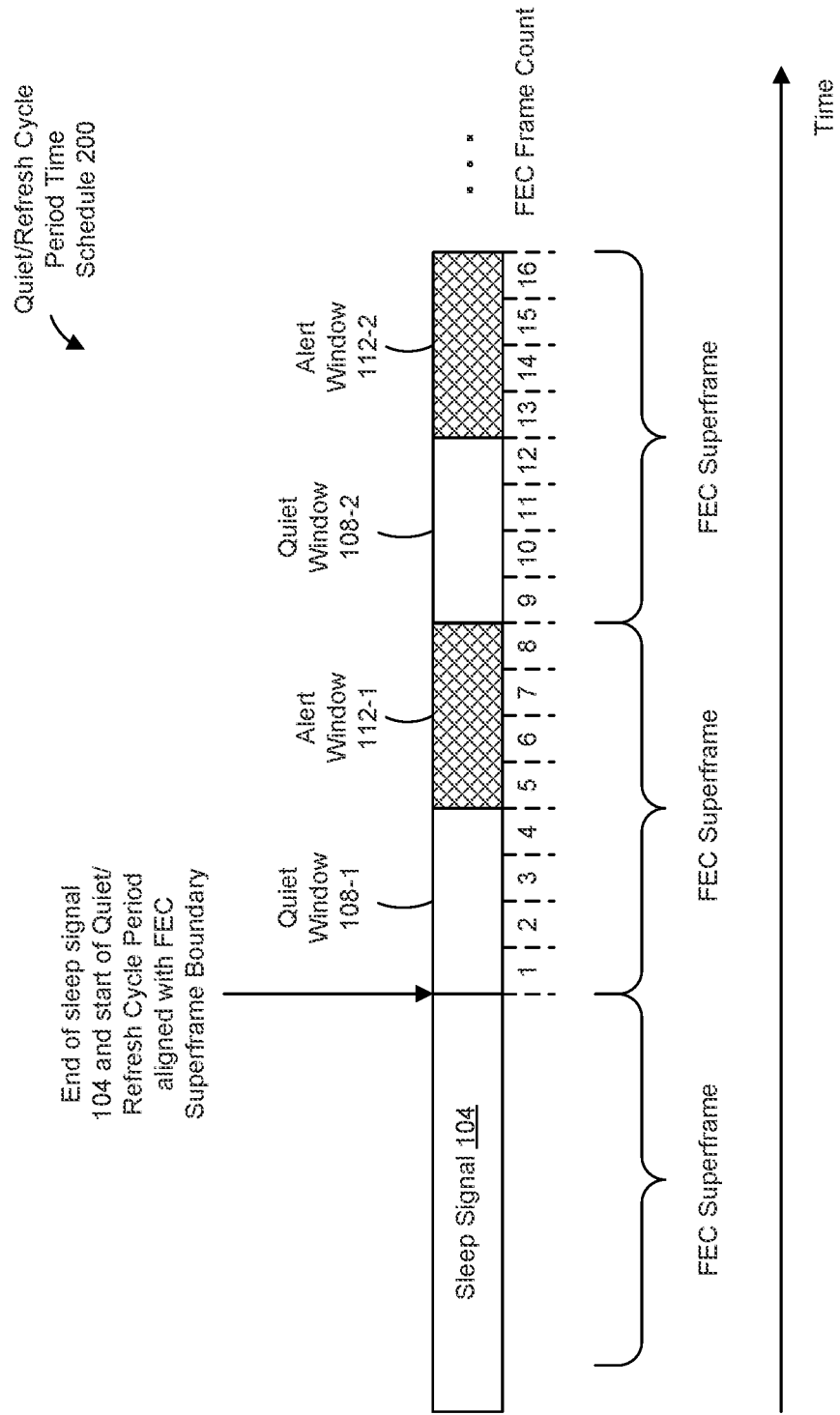
FIG. 2 is a timing diagram of a beginning of an example quiet/refresh cycle period time schedule of a low power mode, according to an embodiment.

FIG. 2 is a timing diagram of a beginning of an example leader quiet/refresh cycle period time schedule 200 of a low power mode, according to an embodiment. An end of the sleep signal is aligned with an FEC superframe boundary that consists of eight FEC frames, and the beginning of the leader quiet/refresh cycle period is aligned with the FEC superframe boundary.

A beginning of each quiet time window 108 is aligned in time with a beginning of a respective superframe, and an end of each alert time window 112 is aligned in time with an end of the respective superframe. Thus, in an embodiment each superframe within the leader quiet/refresh cycle begins with quiet time window 108 and ends with an alert time window 112.

In an embodiment, a time schedule of a corresponding follower quiet/refresh cycle period is similarly structured. For example, a beginning of the follower quiet/refresh cycle period is aligned in time with an FEC superframe boundary. Also, a beginning of each quiet time window within the follower quiet/refresh cycle period is aligned in time with a beginning of a respective superframe, and an end of each alert time window is aligned in time with an end of the respective superframe. Thus, in an embodiment each superframe within the follower quiet/refresh cycle begins with quiet time window and ends with an alert time window.

In some embodiments, a beginning of a sleep signal and an end of the sleep signal are aligned with FEC superframe boundaries, and additionally or alternatively, a beginning of a wake signal and an end of the wake signal are aligned with FEC superframe boundaries.

Figure 3:
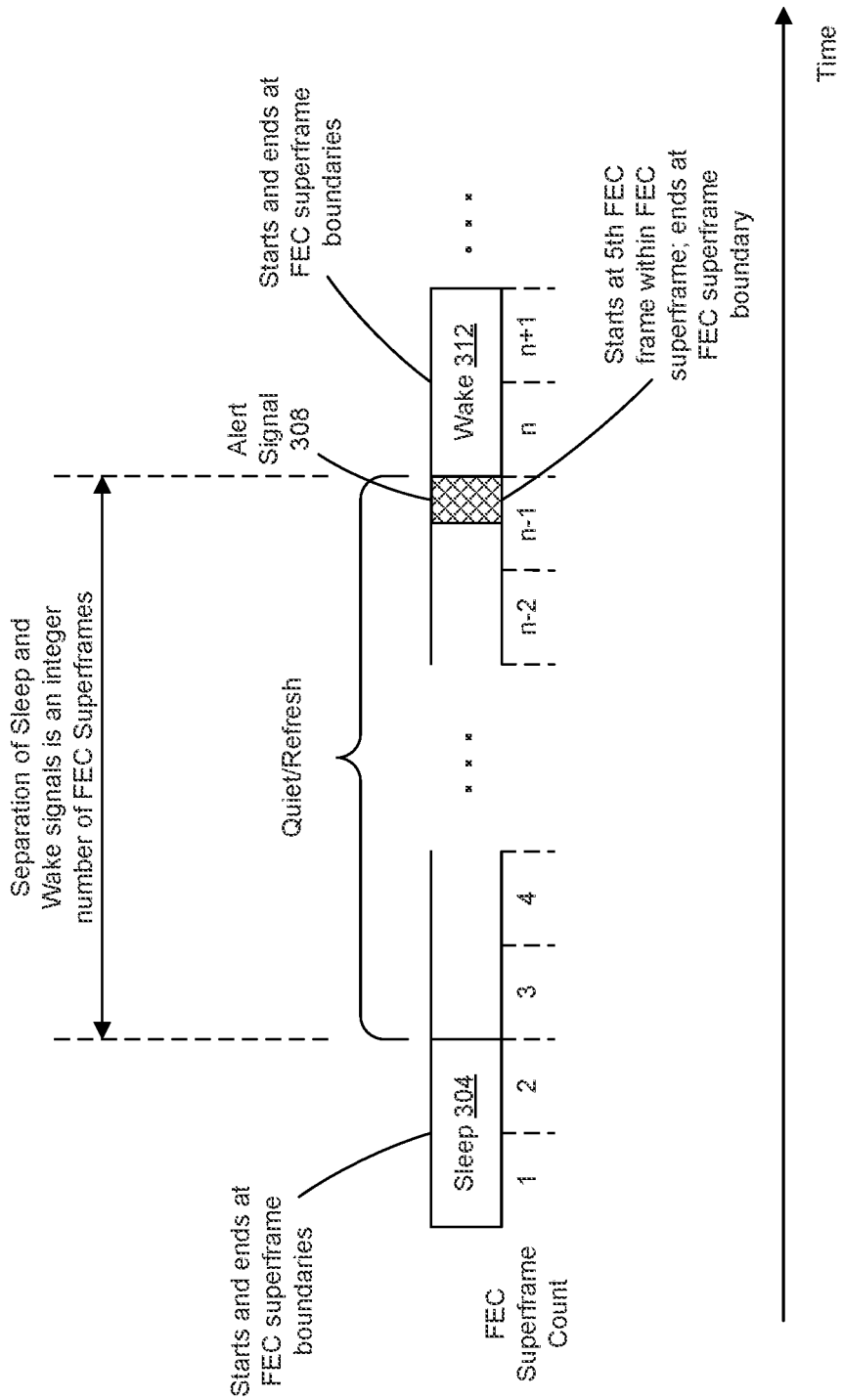
FIG. 3 is a timing diagram illustrating transmission of a sleep signal, an alert signal, and a wake signal during an example low power mode, according to an embodiment.

FIG. 3 is a timing diagram illustrating transmission of a sleep signal 304, an alert signal 308, and a wake signal 312, according to an embodiment. The sleep signal 304 has a duration of two FEC superframes, according to an embodiment. In other embodiments, the sleep signal 304 has another suitable duration. A beginning of the sleep signal 304 is aligned with an FEC superframe boundary, and an end of the sleep signal 304 is aligned with an FEC superframe boundary.

The alert signal 308 has a duration of one half of an FEC superframe (e.g., four FEC frames), according to an embodiment. In other embodiments, the alert signal 308 has another suitable duration. A beginning of the alert signal 308 is not aligned with an FEC superframe boundary, and begins at a fifth-occurring FEC frame within an FEC superframe. An end of the alert signal 308 is aligned with an FEC superframe boundary.

The wake signal 312 has a duration of two FEC superframes, according to an embodiment. In other embodiments, the wake signal 312 has another suitable duration. A beginning of the wake signal 312 coincides with an end of the alert signal 308. The beginning of the wake signal 312 is aligned with an FEC superframe boundary, and an end of the wake signal 312 is aligned with an FEC superframe boundary.

In an embodiment, the end of the sleep signal 304 and the beginning of the wake signal are spaced apart in time by an integer number of FEC superframes. In an embodiment, the end of the sleep signal 304 and the beginning of the wake signal are spaced apart in time by an integer number of FEC superframes that is at least one.

Figure 4:
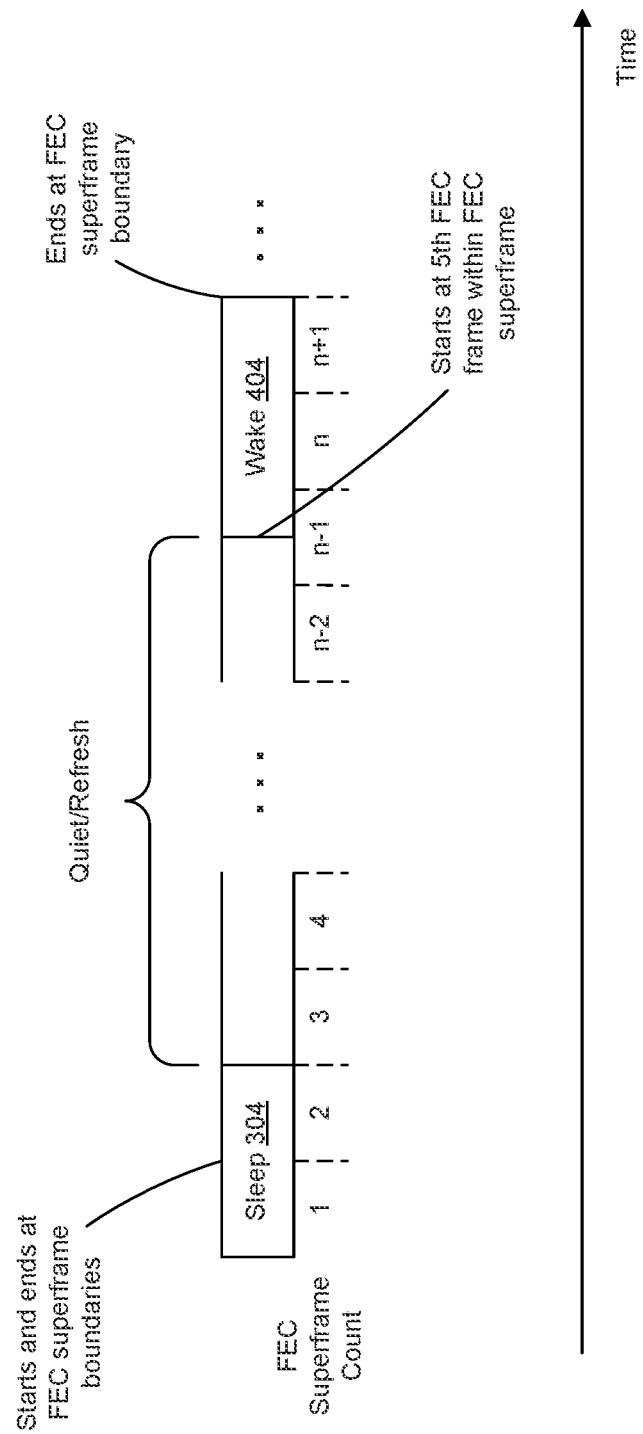
FIG. 4 is a timing diagram illustrating transmission of a sleep signal and a wake signal during another example low power mode, according to another embodiment.

FIG. 4 is a timing diagram illustrating transmission of the sleep signal 304 and a wake signal 404, according to another embodiment. Unlike the embodiment of FIG. 3, an alert signal is not transmitted prior to a wake signal in FIG. 4. Rather, a wake signal 404 is transmitted without first transmitting an alert signal.

A beginning of the wake signal 404 is not aligned with an FEC superframe boundary, and begins at a fifth-occurring FEC frame within an FEC superframe. The wake signal 404 has a duration of 2.5 FEC superframes, according to an embodiment. In other embodiments, the wake signal 404 has another suitable duration. An end of the wake signal 404 is aligned with an FEC superframe boundary.

In an embodiment, the end of the sleep signal 304 and the beginning of the wake signal 404 are spaced apart in time by at least 0.5 FEC superframe plus 0, 1, 2, . . . FEC superframes.

Figure 5:
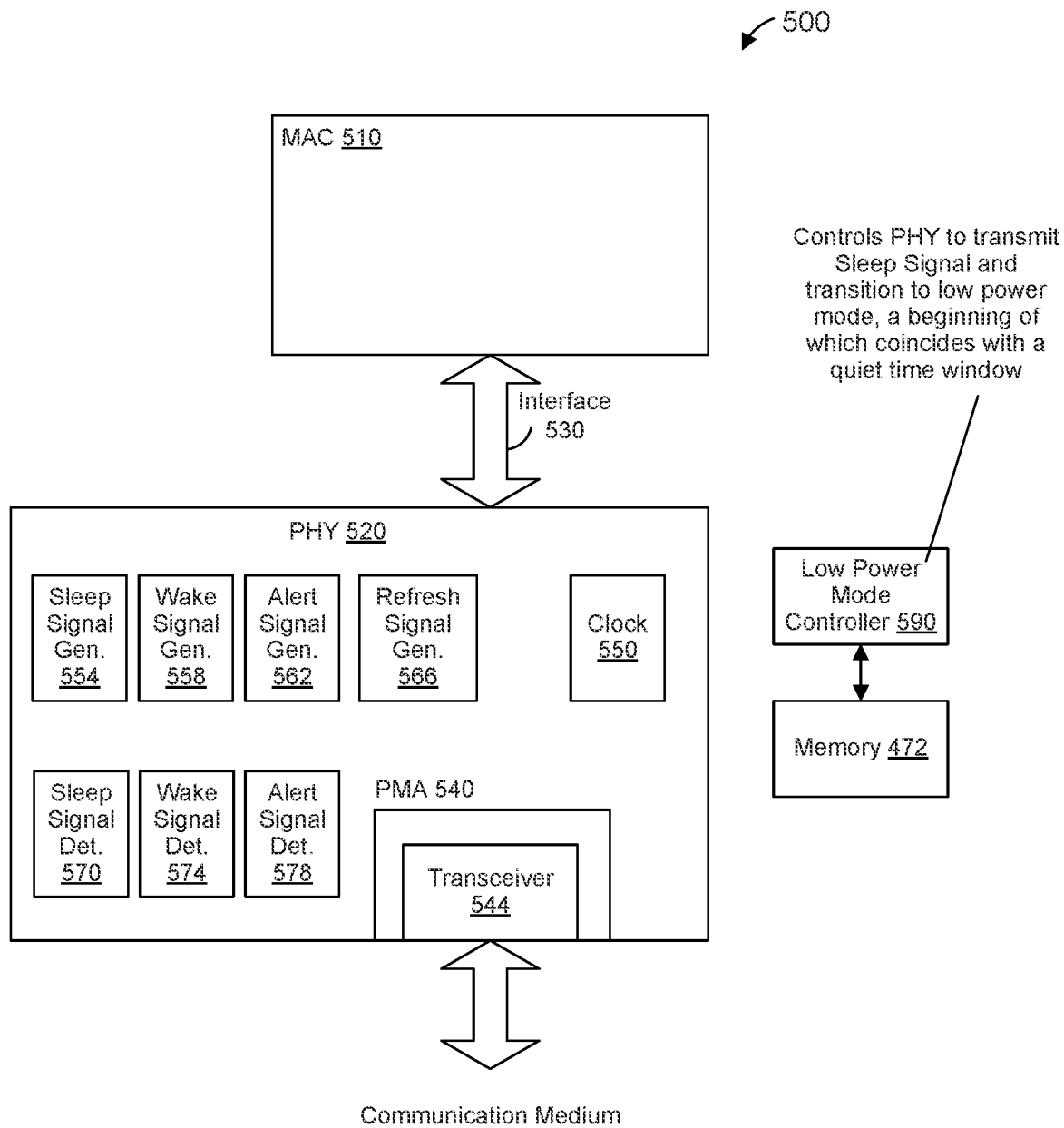
FIG. 5 is a block diagram of an example network interface device that implements a power saving mode that involves a quiet/refresh cycle period, according to an embodiment.

FIG. 5 is a block diagram of an example network interface device 500 that implements power saving techniques such as described above, according to an embodiment. The network interface device 500 is configured to operate as a leader, in some embodiments. The network interface device 500 is configured to operate as a leader, in other embodiments. In some embodiments, the network interface device 500 is reconfigurable to operate as a leader in some scenarios and to operate as a follower in other scenarios.

The network interface device 500 includes at least a media access control (MAC) processing device 510 and physical layer (PHY) circuitry 520. In some embodiments, the MAC processing device 510 and the PHY circuitry 520 are configured to operate according to a communication protocol such as the IEEE 802.3 Ethernet Standard, a future iteration of the IEEE 802.3 Ethernet Standard, or another suitable communication protocol.

The MAC processing device 510 is configured to perform MAC layer functions associated with the communication protocol such as the communication protocol defined by the IEEE 802.3 Ethernet Standard, a future iteration of the IEEE 802.3 Ethernet Standard, or another suitable communication protocol. Similarly, the PHY circuitry 520 is configured to perform PHY functions associated with a communication protocol such as the communication protocol defined by the IEEE 802.3 Ethernet Standard, a future iteration of the IEEE 802.3 Ethernet Standard, or another suitable communication protocol.

In an embodiment the MAC processing device 510 comprises a processor (not shown) and a memory (not shown) coupled to the processor, where the processor is configured to execute machine readable instructions stored in the memory. In an embodiment, the memory stores machine readable instructions that, when executed by the processor, cause the processor to perform MAC layer functions associated with a communication protocol such as the communication protocol defined by the IEEE 802.3 Ethernet Standard, a future iteration of the IEEE 802.3 Ethernet Standard, or another suitable communication protocol.

In another embodiment the MAC processing device 510 additionally or alternatively comprises a hardware state machine (not shown) configured to perform MAC layer functions associated with a communication protocol such as the communication protocol defined by the IEEE 802.3 Ethernet Standard, a future iteration of the IEEE 802.3 Ethernet Standard, or another suitable communication protocol.

The MAC processing device 510 is communicatively coupled to the PHY circuitry 520 via a communication interface 530 such as a 10 Gigabit Media Independent Interface (XGMII). In other embodiments, the MAC processing device 410 is communicatively coupled to the PHY processing device 520 via another suitable communication interface (e.g., the 10 Gigabit Attachment Unit Interface (XAUI), the XFI interface for the small form factor pluggable module (XFP), the SFI interface for small form factor pluggable plus (SFP+), the Universal Serial Gigabit Media Independent Interface (USXGMII), the reduced media-independent interface (RMII), the Gigabit Media Independent Interface (GMII), the reduced gigabit media-independent interface (RGMII), the serial gigabit media-independent interface (SGMII), the high serial gigabit media-independent interface (HSGMII), the quad serial gigabit media-independent interface (QSGMII), etc.), according to some embodiments.

In an embodiment, the MAC processing device 510 provides data for transmission to the PHY circuitry 520 via the interface 530. In response to receiving the data from the MAC processing device 510, the PHY circuitry 520 encodes, scrambles, and modulates the data to generate a transmission signal for transmitting the data via a suitable communication medium such as a wired, optical, or wireless communication medium.

In an embodiment, the PHY circuitry 520 also receives a receive signal via the communication medium, and demodulates, de-scrambles, and decodes data in the receive signal to generate received data. Additionally, the PHY circuitry 520 provides at least some of the received data to the MAC processing device 510 via the interface 5430. In various embodiments, the PHY circuitry 520 includes one or more encoder devices (not shown), a scrambler device (not shown), for encoding, and scrambling data as part of generating a transmission signal, according to an embodiment. The PHY circuitry 520 also includes a de-scrambler device (not shown), and one or more decoder devices (not shown) for de-scrambling, and decoding as part of generating the received data, according to an embodiment.

The PHY circuitry 520 includes physical medium attachment (PMA) sublayer circuitry 540 that is configured to perform PMA sublayer functions defined by the communication protocol. The PMA sublayer circuitry 540 includes a transceiver 544 that is configured to transmit signals and receive signals via the communication medium.

The PMA sublayer circuitry 540 includes a modulator (not shown) that modulates data as part of generating a transmission signal, according to an embodiment. The PMA sublayer circuitry 540 also includes a demodulator (not shown) that demodulates information bits from a received signal as part of generating the received data, according to an embodiment.

In some embodiments, the PMA sublayer circuitry 540 also includes an analog-to-digital converter (hereinafter "ADC", not shown) that converts an analog signal received via the communication medium to a digital signal. In some embodiments, the PMA sublayer circuitry 440 also includes a digital-to-analog converter (hereinafter "DAC", not shown) that converts a digital signal to an analog signal for transmission via the communication medium.

In some embodiments, the PHY circuitry 520 also includes digital signal processing circuitry (hereinafter "DSP", not shown) that processes the digital signal to generate a signal corresponding to modulation symbols that are then demodulated by the demodulator (not shown). In some embodiments, at least some functions of the PMA sublayer circuitry 540 are performed by the DSP.

The PHY circuitry 520 includes a clock 550 that is used to determine timing of transmit and reception operations. When operating as a leader, the clock 550 is a free running clock, according to an embodiment. When operating as a follower, the PHY circuitry 420 recovers a leader clock from a signal received from the leader via the communication medium, and synchronizes the clock 550 to the leader clock, according to an embodiment.

The PHY circuitry 520 includes a sleep signal generator 554 that is configured to generate a sleep signal defined by the communication protocol. The sleep signal is configured to, when transmitted to a link partner via the communication medium, prompt the link partner to enter a low power mode of operation such as described above. For example, the sleep signal generator 554 generates the sleep signal 104 of FIGS. 1-2 and/or the sleep signal 304 of FIGS. 3-4, according to various embodiments.

The PHY circuitry 520 also includes a wake signal generator 558 that is configured to generate a wake signal defined by the communication protocol. The wake signal is configured to, when transmitted to a link partner via the communication medium, prompt the link partner to exit a low power mode of operation such as described above. For example, the wake signal generator 558 generates the wake signal 312 of FIG. 3 and/or the wake signal 404 of FIG. 4, according to various embodiments.

The PHY circuitry 520 also includes an alert signal generator 562 that is configured to generate an alert signal defined by the communication protocol. The alert signal is configured to, when transmitted to a link partner via the communication medium, warn the link partner that a wake signal will be transmitted such as described above. For example, the alert signal generator 562 generates the alert signal 308 of FIG. 3, according to an embodiment. In some embodiments, the alert signal generator 562 is omitted.

The PHY circuitry 520 also includes a refresh signal generator 566 that is configured to generate refresh signals defined by the communication protocol. The refresh signals are configured to, when transmitted to a link partner via the communication medium, facilitate the link partner to adapt filters (e.g., equalization filters) of the link partner and, if the link partner is a follower, facilitate the follower maintaining clock synchronization with the leader.

The PHY circuitry 520 also includes a sleep signal detector 570 that is configured to detect a wake signal received from the link partner via the communication medium. The PHY circuitry 520 also includes a wake signal detector 574 that is configured to detect a wake signal received from the link partner via the communication medium. The PHY circuitry 520 further includes an alert signal detector 578 that is configured to detect an alert signal received from the link partner via the communication medium. In some embodiments, the alert signal detector 578 is omitted.

The PHY circuitry 520 includes or is coupled to a low power mode controller 590 that is configured to control operation of the PHY circuitry 520 according to a low power mode timing schedule and according to various operating states and/or modes, and to control transitioning between the operating states and/or modes. For example, the controller 590 is configured to, in response to receiving a sleep signal and after the sleep signal ends, immediately transition to a mode in which the PHY circuitry 520 ignores any received signals during a quiet time period, according to an embodiment. As another example, the controller 590 is configured to, after transmitting a sleep signal, immediately transition to a mode in which the PHY circuitry 520 quiet transmissions for a time period even if the controller 590 determines, during the time period, that the PHY circuitry 520 is to exit the low power mode, according to an embodiment.

As another example, the controller 590 is configured to, when reception of a refresh signal ends, immediately transition to a mode in which the PHY circuitry 520 ignores any received signals during a quiet time period, according to an embodiment. As another example, the controller 590 is configured to, after transmitting a refresh signal, immediately transition to a mode in which the PHY circuitry 520 quiet transmissions for a time period, according to an embodiment.

In an embodiment, the controller 590 comprises a hardware state machine in which at least some states of the hardware state machine generally correspond to at least some of the various operating states and/or modes of the PHY circuitry 520. The hardware state machine is configured to generate control signals that control operation of the PHY circuitry 520 according to various operating states and/or modes, and to transition between states of the hardware state machine in response to receiving signals and/or according to a time schedule.

In another embodiment, the controller 590 comprises a processor that executes machine readable instructions that causes the processor to implement a state machine similar to the hardware state machine described above.

Figure 6:
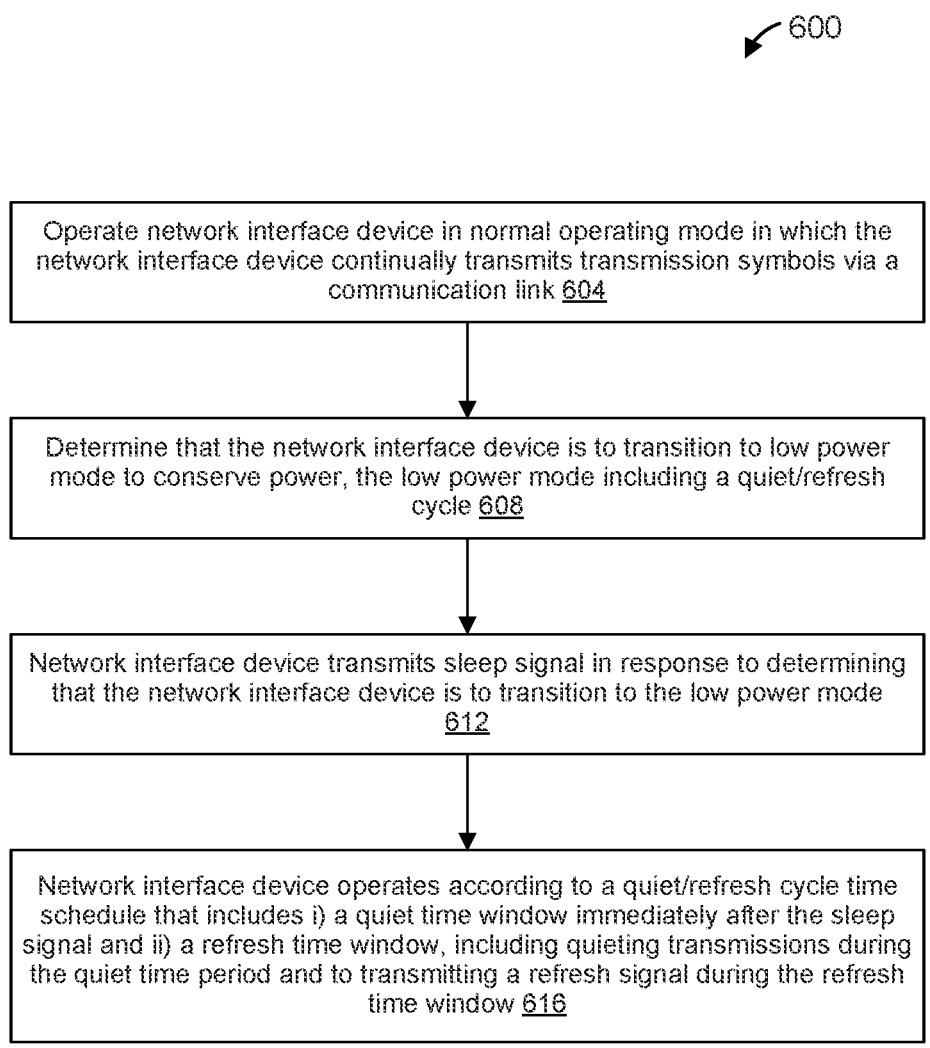
FIG. 6 is a flow diagram of an example method for power saving regarding a communication link, according to an embodiment.

FIG. 6 is a flow diagram of an example method 600 for power saving in a communication device that includes a network interface device, according to an embodiment. The method 600 is implemented by the network interface device 500 of FIG. 5, according to an embodiment, and the method 600 is described with reference to FIG. 5 for ease of explanation. In other embodiments, the method 600 is implemented by another suitable network interface device. Additionally, the network interface device 500 does not implement the method 600 and/or implements another suitable method for power saving different than the method 600, in some embodiments. In some embodiments, the method 600 involves a quiet/refresh cycle time schedule described above with reference to any of FIGS. 1-4, and the method 600 is described with reference to FIGS. 1-4 for ease of explanation. In other embodiments, the method 600 involves a suitable quiet/refresh cycle time schedule different than the quiet/refresh cycle time schedules described above with reference to FIGS. 1-4.

At block 604, a network interface device operates in a normal operating mode in which the network interface device continually transmits transmission symbols via a communication link. For example, the controller 590 controls the PHY circuitry 520 to operate in the normal operating mode in which the PHY circuitry 520 continually transmits transmission symbols via the communication link.

At block 608, the network interface device determines that the network interface device is to transition to a low power mode in which the network interface device will not transmit to conserve power. In an embodiment, the low power mode includes operating according to the quiet/refresh cycle period 100 (FIG. 1). In another embodiment, the low power mode includes operating according to the quiet/refresh cycle period 150 (FIG. 1). In another embodiment, the low power mode includes operating according to the quiet/refresh cycle period 200 (FIG. 2). In another embodiment, the low power mode includes operating according to the quiet/refresh cycle period 300 (FIG. 3). In another embodiment, the low power mode includes operating according to the quiet/refresh cycle period 400 (FIG. 4). In an embodiment, the low power mode controller 590 determines that the PHY circuitry 520 is to transition to the low power mode. For example, the low power mode controller 590 determines that the PHY circuitry 520 is to transition to the low power mode in response to receiving a signal from the MAC processor 510 instructing the PHY circuitry 520 to transition to the low power mode, according to an embodiment. For example, the MAC processor 510 sends the signal to the PHY processor 520 via the communication interface 530, and the low power mode controller 590 interprets the signal as an instruction to transition to the low power mode. In various other embodiments, determining that the network interface device is to transition to the low power mode is based on one or more of i) determining that the network interface device does not have data to transmit, ii) determining that power consumption by the network interface device is to be reduced, etc.

At block 612, in response to determining that the network interface device is to transition to the low power mode at block 608, the network interface transmits a sleep signal to a link partner. For example, the controller 590 controls the PHY circuitry 520 to transmit a sleep signal. In some embodiments, transmitting the sleep signal at block 612 comprises transmitting the sleep signal 104 described above with reference to FIGS. 1-2. In some embodiments, transmitting the sleep signal at block 612 comprises transmitting the sleep signal 304 described above with reference to FIGS. 3-4. In an embodiment, transmitting the sleep signal at block 612 comprises ending transmission of the sleep signal on an FEC superframe boundary. In another embodiment, transmitting the sleep signal at block 612 comprises beginning transmission of the sleep signal on a first FEC superframe boundary and ending transmission of the sleep signal on a second FEC superframe boundary. In an embodiment, the sleep signal generator 554 generates the sleep signal.

At block 616, also in response to determining that the network interface device is to transition to the low power mode at block 608 and in connection with an end of transmission of the sleep signal at block 612, the network interface device operates according to a quiet/refresh cycle time schedule that includes i) a quiet time window immediately after the sleep signal and ii) a refresh time window. As an example, the controller 590 controls the PHY circuitry 520 to operates according to the quiet/refresh cycle time schedule. Operating according to the quiet/refresh cycle at block 616 comprises quieting transmissions during the quiet time period and transmitting a refresh signal during the refresh time window, according to an embodiment. In an embodiment, the refresh signal generator 566 generates the refresh signal. Operating according to the quiet/refresh cycle time schedule at block 616 comprises transitioning to the quiet window at an FEC superframe boundary that coincides with an end of transmission of the sleep signal at block 612.

In an embodiment, operating according to the quiet/refresh cycle time schedule at block 616 comprises operating according to a quiet/refresh cycle time schedule that includes i) a plurality of quiet time windows, and ii) a plurality of alert time windows, where alert time windows alternate in time with quiet time windows. The link partner keeps the receive circuitry powered to be ready to receive a signal from the network interface device in connection with exiting the low power mode, according to an embodiment. Transmitting the refresh signal at block 616 comprises transmitting the refresh signal during a refresh time window that is within a last-occurring quiet time window in the time schedule, In an embodiment, the network interface device and the link partner are synchronized according to FEC frame time periods; the last-occurring quiet time window corresponds to at least four FEC frame time periods, including a first-occurring FEC frame time period, a last-occurring FEC frame time period, and at least two middle-occurring FEC frame time periods; and transmitting the refresh signal at block 616 comprises transmitting the refresh signal during a refresh time window overlaps with at least one of the at least two middle-occurring FEC frame time periods, does not overlap with the first-occurring FEC frame time period, and does not overlap with the last-occurring FEC frame time period. In an embodiment, the at least two middle-occurring FEC frame time periods include a second-occurring FEC frame time period and a third-occurring FEC frame time period; the last-occurring FEC frame time period is a fourth-occurring FEC frame time period; and transmitting the refresh signal at block 616 comprises transmitting the refresh signal during a refresh time window that overlaps with the third-occurring FEC frame time period, does not overlap with the second-occurring FEC frame time period, and does not overlap with the fourth-occurring FEC frame time period.

In some embodiments, operating according to the quiet/refresh cycle time schedule at block 616 comprises operating according to a quiet/refresh cycle described above with reference to FIG. 1. In other embodiments, operating according to the quiet/refresh cycle time schedule at block 616 comprises operating according to a quiet/refresh cycle described above with reference to FIG. 2. In other embodiments, operating according to the quiet/refresh cycle time schedule at block 616 comprises operating according to a quiet/refresh cycle described above with reference to FIG. 3. In other embodiments, operating according to the quiet/refresh cycle time schedule at block 616 comprises operating according to a quiet/refresh cycle described above with reference to FIG. 4.

Figure 7:
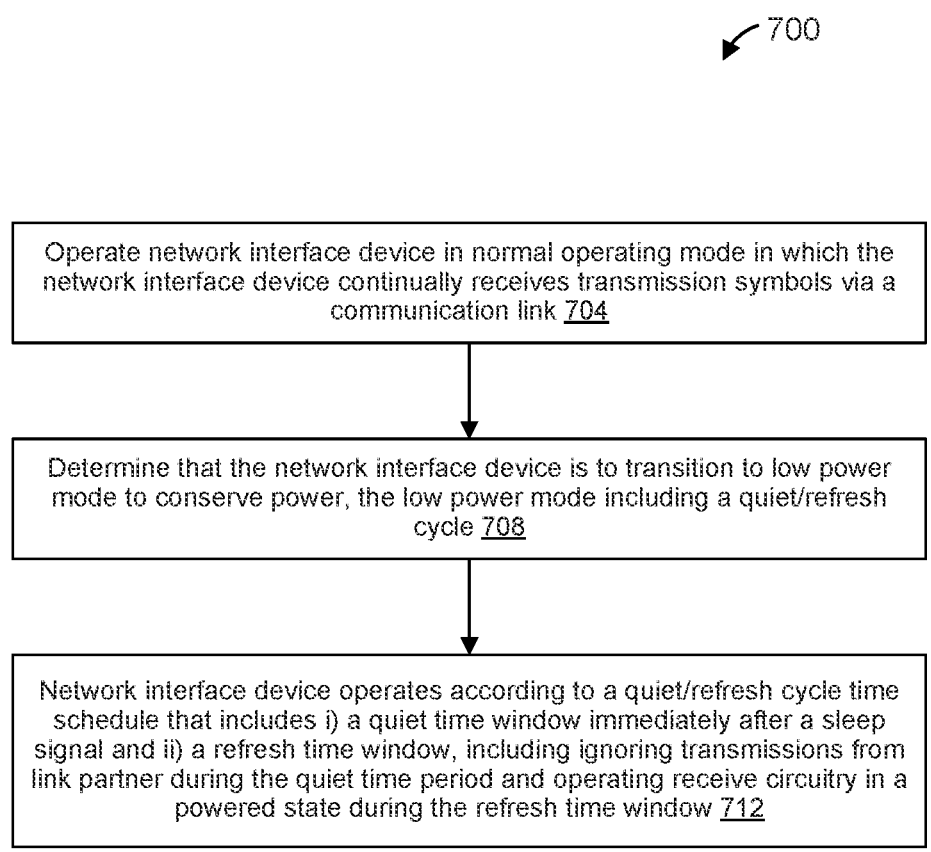
FIG. 7 is a flow diagram of another example method for power saving regarding a communication link, according to another embodiment.

FIG. 7 is a flow diagram of another example method 700 for power saving in a communication device that includes a network interface device, according to an embodiment. The method 700 is implemented by the network interface device 500 of FIG. 5, according to an embodiment, and the method 700 is described with reference to FIG. 5 for ease of explanation. In other embodiments, the method 700 is implemented by another suitable network interface device. Additionally, the network interface device 500 does not implement the method 700 and/or implements another suitable method for power saving different than the method 700, in some embodiments. In some embodiments, the method 700 involves a quiet/refresh cycle time schedule described above with reference to any of FIGS. 1-4, and the method 700 is described with reference to FIGS. 1-4 for ease of explanation. In other embodiments, the method 700 involves a suitable quiet/refresh cycle time schedule different than the quiet/refresh cycle time schedules described above with reference to FIGS. 1-4.

At block 704, a network interface device operates in a normal operating mode in which the network interface device continually receives transmission symbols from a link partner via a communication link. For example, the controller 590 controls the PHY circuitry 520 to operate in the normal operating mode in which the PHY circuitry 520 continually receives transmission symbols from the link partner via the communication link.

At block 708, the network interface determines that the network interface device is to transition to a low power mode in which the link partner will not transmit during a quiet time period to conserve power. In an embodiment, the low power mode includes operating according to the quiet/refresh cycle period 100 (FIG. 1). In another embodiment, the low power mode includes operating according to the quiet/refresh cycle period 150 (FIG. 1). In another embodiment, the low power mode includes operating according to the quiet/refresh cycle period 200 (FIG. 2). In another embodiment, the low power mode includes operating according to the quiet/refresh cycle period 300 (FIG. 3). In another embodiment, the low power mode includes operating according to the quiet/refresh cycle period 400 (FIG. 4). In an embodiment, the low power mode controller 590 determines that the PHY circuitry 520 is to transition to the low power mode.

Determining that the network interface device is to transition to the low power mode at block 708 comprises determining that the network interface device is to transition to the low power mode in response to receiving a sleep signal from the link partner. For example, the low power mode controller 590 determines that the PHY circuitry 520 is to transition to the low power mode in response to the PHY circuitry 520 receiving a sleep signal from the link partner via the communication link, according to an embodiment. In an embodiment, the sleep signal detector 570 detects the sleep signal from the link partner and informs the low power mode controller 590 that the sleep signal was detected; the low power mode controller 590 determines that the PHY circuitry 520 is to transition to the low power mode in response to being informed by the sleep signal detector 570 that the sleep signal from the link partner was detected.

In some embodiments, receiving the sleep signal at block 708 comprises receiving the sleep signal 104 described above with reference to FIGS. 1-2. In some embodiments, receiving the sleep signal at block 708 comprises receiving the sleep signal 304 described above with reference to FIGS. 3-4. In an embodiment, receiving the sleep signal at block 708 comprises receiving a sleep signal that begins on an FEC superframe boundary. In another embodiment, receiving the sleep signal at block 708 comprises receiving a sleep signal that begins on a first FEC superframe boundary and ends on a second FEC superframe boundary.

At block 712, in response to determining that the network interface device is to transition to the low power mode at block 708 and in connection with an end of reception of a sleep signal, the network interface device operates according to a quiet/refresh cycle time schedule that includes i) a quiet time window immediately after the sleep signal and ii) a refresh time window. As an example, the controller 590 controls the PHY circuitry 520 to operates according to the quiet/refresh cycle time schedule. Operating according to the quiet/refresh cycle at block 712 comprises ignoring transmissions from the link partner during the quiet time period and operating receive circuitry in a powered state during the refresh time window to receive a refresh signal during the refresh time window, according to an embodiment. Operating according to the quiet/refresh cycle at block 712 comprises powering down at least some receive circuitry during the quiet time period, according to an embodiment.

Operating according to the quiet/refresh cycle time schedule at block 712 comprises transitioning to the quiet window at an FEC superframe boundary that coincides with an end of transmission of the sleep signal at block 708.

In an embodiment, operating according to the quiet/refresh cycle time schedule at block 712 comprises operating according to a quiet/refresh cycle time schedule that includes i) a plurality of quiet time windows, and ii) a plurality of alert time windows, where alert time windows alternate in time with quiet time windows; ignoring transmissions from the link partner during the quiet time windows; keeping receive circuitry powered during the alert windows to be ready to receive a signal from the link partner in connection with exiting the low power mode, according to an embodiment. Operating according to the quiet/refresh cycle time schedule at block 712 comprises receiving a refresh signal during a refresh time window that is within a last-occurring quiet time window in the time schedule, and transitioning back to a remaining portion of the last-occurring quiet time window immediately after ending reception of the refresh signal, according to an embodiment. Operating according to the quiet/refresh cycle time schedule at block 712 comprises receiving a refresh signal during a refresh time window that is within a last-occurring quiet time window in the time schedule, and ignoring transmissions by the link partner for a remaining portion of the last-occurring quiet time window immediately after ending reception of the refresh signal, according to an embodiment. Operating according to the quiet/refresh cycle time schedule at block 712 comprises receiving a refresh signal during a refresh time window that is within a last-occurring quiet time window in the time schedule, and controlling at least some receive circuitry to be in a powered off state for a remaining portion of the last-occurring quiet time window immediately after ending reception of the refresh signal, according to an embodiment.

In an embodiment, the network interface device and the link partner are synchronized according to FEC frame time periods; the last-occurring quiet time window corresponds to at least four FEC frame time periods, including a first-occurring FEC frame time period, a last-occurring FEC frame time period, and at least two middle-occurring FEC frame time periods; and receiving the refresh signal at block 712 comprises receiving the refresh signal during a refresh time window overlaps with at least one of the at least two middle-occurring FEC frame time periods, does not overlap with the first-occurring FEC frame time period, and does not overlap with the last-occurring FEC frame time period. In an embodiment, the at least two middle-occurring FEC frame time periods include a second-occurring FEC frame time period and a third-occurring FEC frame time period; the last-occurring FEC frame time period is a fourth-occurring FEC frame time period; and receiving the refresh signal at block 712 comprises receiving the refresh signal during a refresh time window that overlaps with the third-occurring FEC frame time period, does not overlap with the second-occurring FEC frame time period, and does not overlap with the fourth-occurring FEC frame time period.

Operating according to the quiet/refresh cycle time schedule at block 712 comprises receiving a refresh signal during the third-occurring FEC frame time period, and transitioning back to a remaining portion of the last-occurring quiet time window for the fourth-occurring FEC frame time period, according to an embodiment. Operating according to the quiet/refresh cycle time schedule at block 712 comprises receiving a refresh signal during the third-occurring FEC frame time period, and ignoring transmissions by the link partner for during the fourth-occurring FEC frame time period, according to an embodiment. Operating according to the quiet/refresh cycle time schedule at block 712 comprises receiving a refresh signal during the third-occurring FEC frame time period, and controlling at least some receive circuitry to be in a powered off state during the fourth-occurring FEC frame time period, according to an embodiment.

In some embodiments, operating according to the quiet/refresh cycle time schedule at block 712 comprises operating according to a quiet/refresh cycle described above with reference to FIG. 1. In other embodiments, operating according to the quiet/refresh cycle time schedule at block 712 comprises operating according to a quiet/refresh cycle described above with reference to FIG. 2. In other embodiments, operating according to the quiet/refresh cycle time schedule at block 712 comprises operating according to a quiet/refresh cycle described above with reference to FIG. 3. In other embodiments, operating according to the quiet/refresh cycle time schedule at block 712 comprises operating according to a quiet/refresh cycle described above with reference to FIG. 4.

Figure 8:
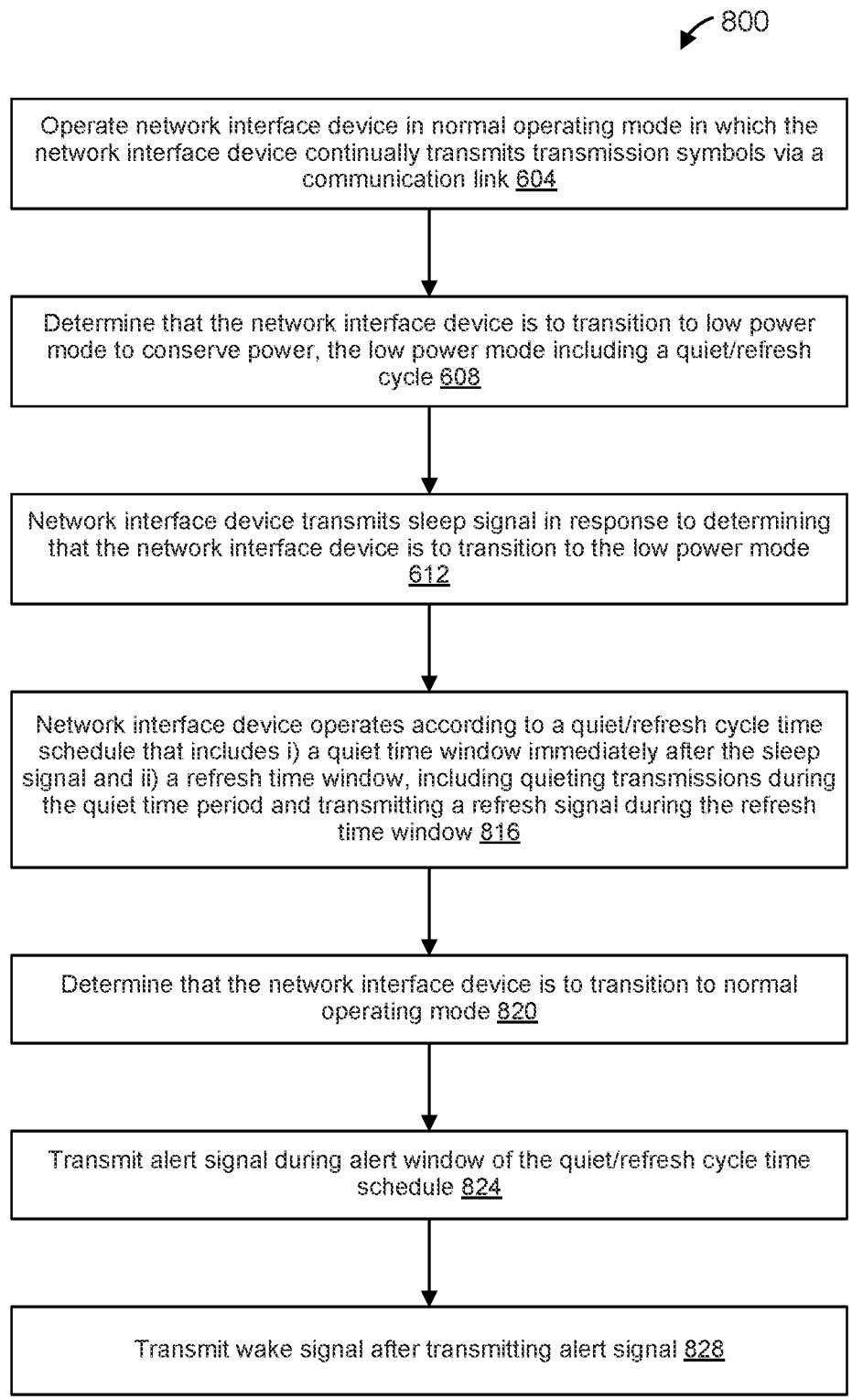
FIG. 8 is a flow diagram of another example method for power saving regarding a communication link, according to another embodiment.

FIG. 8 is a flow diagram of another example method 800 for power saving in a communication device that includes a network interface device, according to another embodiment. The method 800 is implemented by the network interface device 500 of FIG. 5, according to an embodiment, and the method 800 is described with reference to FIG. 5 for ease of explanation. In other embodiments, the method 800 is implemented by another suitable network interface device. Additionally, the network interface device 500 does not implement the method 800 and/or implements another suitable method for power saving different than the method 800, in some embodiments. In some embodiments, the method 800 involves a quiet/refresh cycle time schedule described above with reference to any of FIGS. 1-4, and the method 800 is described with reference to FIGS. 1-4 for ease of explanation. In other embodiments, the method 800 involves a suitable quiet/refresh cycle time schedule different than the quiet/refresh cycle time schedules described above with reference to FIGS. 1-4.

The method 800 includes some of the method flow blocks of FIG. 6. For example, the method 800 includes method flow blocks 604, 608, and 612, and these elements are not described again in detail for purposes of brevity. The method flow block 616 of FIG. 6 is replaced with method flow block 816, and additional method flow blocks 820, 824, and 828, related to transitioning back to the normal mode of operation, are added.

At block 816, also in response to determining that the network interface device is to transition to the low power mode at block 608 and in connection with an end of transmission of the sleep signal at block 612, the network interface device operates according to a quiet/refresh cycle time schedule that includes i) a quiet time window immediately after the sleep signal and ii) a refresh time window. As an example, the controller 590 controls the PHY circuitry 520 to operates according to the quiet/refresh cycle time schedule. Operating according to the quiet/refresh cycle at block 816 comprises quieting transmissions during the quiet time period and, if still in the power saving mode when the refresh time window occurs, transmitting a refresh signal during the refresh time window, according to an embodiment. Operating according to the quiet/refresh cycle time schedule at block 816 comprises transitioning to the quiet window at an FEC superframe boundary that coincides with an end of transmission of the sleep signal at block 612, according to an embodiment.

In an embodiment, operating according to the quiet/refresh cycle time schedule at block 816 comprises operating according to a quiet/refresh cycle time schedule that includes i) a plurality of quiet time windows, and ii) a plurality of alert time windows, where alert time windows alternate in time with quiet time windows. The link partner keeps the receive circuitry powered during the alert windows to be ready to receive a signal from the network interface device in connection with exiting the low power mode, according to an embodiment.

At block 820, the network interface determines that the network interface device is to transition to the normal operating mode. In an embodiment, the low power mode controller 590 determines that the PHY circuitry 520 is to transition to the normal operating mode. For example, the low power mode controller 590 determines that the PHY circuitry 520 is to transition to the normal operating mode in response to receiving a signal from the MAC processor 510 instructing the PHY circuitry 520 to transition to the normal operating mode, according to an embodiment. For example, the MAC processor 510 sends the signal to the PHY processor 520 via the communication interface 530, and the low power mode controller 590 interprets the signal as an instruction to transition to the normal operating mode. In various other embodiments, determining that the network interface device is to transition to the normal operating mode is based on one or more of i) determining that the network interface device has data to transmit, ii) determining that power consumption by the network interface device can be increased, etc.

In some embodiments, determining that the that the network interface device is to transition to the normal operating mode at block 820 comprises determining, while transmitting the sleep signal at block 612, that the network device is to transition to the normal operating mode.

At block 824, in response to determining that the network interface device is to transition to the normal operating mode at block 820, the network interface transmits an alert signal to the link partner during an alert window. For example, the controller 590 controls the PHY circuitry 520 to transmit the alert signal. In some embodiments, transmitting the alert signal at block 824 comprises transmitting an alert signal described above with reference to FIGS. 1-2. In some embodiments, transmitting the alert signal at block 824 comprises transmitting the alert signal 308 described above with reference to FIG. 3. In an embodiment, transmitting the alert signal at block 824 comprises ending transmission of the alert signal on an FEC superframe boundary. In another embodiment, transmitting the alert signal at block 824 comprises beginning transmission of the alert signal on a fourth-occurring FEC frame within an FEC superframe and ending transmission of the alert signal on an ending boundary of the FEC superframe. In an embodiment, the alert signal generator 562 generates the alert signal.

At block 828, in response to determining that the network interface device is to transition to the normal operating mode at block 820 and after transmitting the alert signal at block 824, the network interface transmits a wake signal to the link partner to instruct the link partner to exit the low power mode. For example, the controller 590 controls the PHY circuitry 520 to transmit the wake signal. In some embodiments, transmitting the wake signal at block 828 comprises transmitting a wake signal described above with reference to FIGS. 1-2. In some embodiments, transmitting the wake signal at block 828 comprises transmitting the wake signal 312 described above with reference to FIG. 3. In an embodiment, transmitting the wake signal at block 828 comprises ending transmission of the wake signal on an FEC superframe boundary. In another embodiment, transmitting the wake signal at block 828 comprises beginning transmission of the wake signal on a first FEC superframe boundary and ending transmission of the wake signal a second FEC superframe boundary. In an embodiment, the wake signal generator 558 generates the wake signal.

In some embodiments, if the network interface device determines, while transmitting the sleep signal at block 612, that the network device is to transition to the normal operating mode, the network interface device: goes forward with transitioning to the low power mode at block 820, transmits an alert signal at a first-occurring alert window at block 824, and transmits the wake signal at block 828. In some such embodiments, an end of transmission of the sleep signal is required to occur at first FEC superframe boundary; and transmitting the wake signal at block 828 comprises beginning transmission of the wake signal on a second FEC superframe boundary, and ending transmission of the wake signal at a third FEC superframe boundary.

In some embodiments, transmitting the alert signal at block 824 is omitted; and transmitting the wake signal at block 828 is not performed after transmitting an alert signal. For example, transmitting the wake signal at block 828 is performed as discussed above with reference to FIG. 4.

The method 800 further comprises the network interface device transitioning to the normal operating mode after transmitting the wake signal at block 828. For example, the controller 590 controls the PHY circuitry 520 to transition to the normal operating mode.

FIG. 9 is a flow diagram of another example method 900 for power saving in a communication device that includes a network interface device, according to another embodiment. The method 900 is implemented by the network interface device 500 of FIG. 5, according to an embodiment, and the method 900 is described with reference to FIG. 5 for ease of explanation. In other embodiments, the method 900 is implemented by another suitable network interface device. Additionally, the network interface device 500 does not implement the method 900 and/or implements another suitable method for power saving different than the method 900, in some embodiments. In some embodiments, the method 900 involves a quiet/refresh cycle time schedule described above with reference to any of FIGS. 1-4, and the method 900 is described with reference to FIGS. 1-4 for ease of explanation. In other embodiments, the method 900 involves a suitable quiet/refresh cycle time schedule different than the quiet/refresh cycle time schedules described above with reference to FIGS. 1-4.

The method 900 includes some of the method flow blocks of FIG. 7. For example, the method 900 includes method flow blocks 704 and 708, and these elements are not described again in detail for purposes of brevity. The method flow block 712 of FIG. 7 is replaced with method flow block 912, and additional method flow blocks 916, 920, and 924, related to transitioning back to the normal mode of operation, are added.

At block 912, in response to determining that the network interface device is to transition to the low power mode at block 708 and in connection with an end of reception of a sleep signal, the network interface device operates according to a quiet/refresh cycle time schedule that includes i) a quiet time window immediately after the sleep signal and ii) a refresh time window. As an example, the controller 590 controls the PHY circuitry 520 to operates according to the quiet/refresh cycle time schedule. Operating according to the quiet/refresh cycle at block 912 comprises ignoring transmissions from the link partner during the quiet time period and, if still in the power saving mode when the refresh time window occurs, controlling receive circuitry to be powered to receive a refresh signal during the refresh time window, according to an embodiment. Operating according to the quiet/refresh cycle time schedule at block 912 comprises transitioning to the quiet window at an FEC superframe boundary that coincides with an end of reception of the sleep signal, according to an embodiment.

In an embodiment, operating according to the quiet/refresh cycle time schedule at block 912 comprises operating according to a quiet/refresh cycle time schedule that includes i) a plurality of quiet time windows, and ii) a plurality of alert time windows, where alert time windows alternate in time with quiet time windows. The network interface device keeps the receive circuitry powered during the alert windows to be ready to receive a signal from the network interface device in connection with exiting the low power mode, according to an embodiment.

At block 916, the network interface device controls the receive circuitry to be powered during an alert window and receives an alert signal during the alert window. For example, the controller 590 controls the PHY circuitry 520 to be powered during the alert time window, and the alert signal detector 578 detects the alert signal during the alert time window. In some embodiments, receiving the alert signal at block 916 comprises receiving an alert signal described above with reference to FIGS. 1-2. In some embodiments, receiving the alert signal at block 916 comprises receiving the alert signal 308 described above with reference to FIG. 3. In an embodiment, receiving the alert signal at block 916 comprises receiving an alert signal that ends in connection with an FEC superframe boundary. In another embodiment, receiving the alert signal at block 916 comprises beginning controlling receive circuitry of the network interface device to be powered during a fourth-occurring FEC frame within an FEC superframe.

At block 920, in response to receiving the alert signal at block 916, the network interface device controls the receive circuitry to remain powered after the alert window in anticipation of receiving a wake signal, and the network interface device receives the wake signal after receiving the alert signal at block 916. For example, the controller 590 controls the PHY circuitry 520 to be powered during the alert time window, and the alert signal detector 578 detects the alert signal during the alert time window. In some embodiments, receiving the wake signal at block 920 comprises receiving a wake signal described above with reference to FIGS. 1-2. In some embodiments, receiving the wake signal at block 920 comprises receiving the wake signal 312 described above with reference to FIG. 3. In an embodiment, receiving the wake signal at block 920 comprises ending reception of the wake signal in connection with an FEC superframe boundary. In another embodiment, receiving the wake signal at block 828 comprises beginning reception of the wake signal on a first FEC superframe boundary and ending reception of the wake signal a second FEC superframe boundary.

In some embodiments, receiving the alert signal at block 916 is omitted; and receiving the wake signal at block 920 is not performed after receiving an alert signal. For example, receiving the wake signal at block 920 is performed as discussed above with reference to FIG. 4.

At block 924, the network interface device transitions to the normal operating mode in response to receiving the wake signal at block 920. For example, the controller 590 controls the PHY circuitry 520 to transition to the normal operating mode in response to receiving the wake signal.

Embodiment 1: A network interface device, comprising: physical layer (PHY) circuitry comprising a transceiver, the PHY processor being configured to perform PHY functions associated with a communication link; and a controller. The controller is configured to: operate the PHY circuitry in a normal receive operating mode in which the PHY circuitry continually receives transmission symbols from a link partner via the communication link; determine that receive circuitry of the PHY circuitry is to transition to a low power mode in response to receiving a sleep signal from the link partner; and in response to determining that the receive circuitry is to transition to the low power mode and after receiving the sleep signal, control the PHY circuitry to operate according to a quiet/refresh cycle of the low power mode to conserve power, the quiet/refresh cycle corresponding to a time schedule that includes a refresh time window in which receive circuitry of the PHY circuitry is to be powered to receive a refresh signal from the link partner to facilitate keeping the receive circuitry of PHY circuitry synchronized with the link partner, including controlling the PHY circuitry to transition, immediately after transmission of the sleep signal, to a quiet time window of the time schedule in which the PHY circuitry ignores transmissions from the link partner.

Embodiment 2: The network device of embodiment 1, wherein: the refresh time window is within a last-occurring quiet time window in the time schedule; and the controller is configured to control the PHY circuitry to be powered to receive the refresh signal during the refresh time window that is within the last-occurring quiet time window and to ignore transmissions from the link partner during a remainder of the last-occurring quiet time window after the refresh time window.

Embodiment 3: The network device of embodiment 2, wherein: the PHY circuitry is configured to synchronize with the link partner according to forward error correction (FEC) frame time periods; the last-occurring quiet time window corresponds to at least four FEC frame time periods, including a first-occurring FEC frame time period, a last-occurring FEC frame time period, and at least two middle-occurring FEC frame time periods; the refresh time window overlaps with at least one of the at least two middle-occurring FEC frame time periods, does not overlap with the first-occurring FEC frame time period, and does not overlap with the last-occurring FEC frame time period; and the controller is configured to control the PHY circuitry to: be powered to receive the refresh signal during the at least one of the at least two middle-occurring FEC frame time periods, and ignore transmissions from the link partner during last-occurring FEC frame time period.

Embodiment 4: The network device of embodiment 3, wherein: the at least two middle-occurring FEC frame time periods include a second-occurring FEC frame time period and a third-occurring FEC frame time period; the last-occurring FEC frame time period is a fourth-occurring FEC frame time period; the refresh time window overlaps with the third-occurring FEC frame time periods, does not overlap with the second-occurring FEC frame time period, and does not overlap with the fourth-occurring FEC frame time period; and the controller is configured to control the PHY circuitry to: power the receive circuitry during the third-occurring FEC frame time period to receive the refresh signal, and ignore transmissions from the link partner during fourth-occurring FEC frame time period.

Embodiment 5: The network device of any of embodiments 1-4, wherein: the PHY circuitry is configured to synchronize with the link partner according to forward error correction (FEC) superframe time periods, each FEC superframe time period corresponding to a predetermined number of FEC frame time periods; and the controller is configured to control the PHY circuitry to transition to the quiet time window at a FEC superframe boundary that coincides with an end of reception of the sleep signal.

Embodiment 6: A method for power saving regarding a communication link, the method comprising: operating a network interface device in a normal transmit operating mode in which the network interface device continually receives transmission symbols from a link partner via the communication link; determining, at the network interface device, that receive circuitry of the network interface device is to transition to a low power mode in response to receiving a sleep signal from the link partner; in response to determining that the receive circuitry is to transition to the low power mode and after receiving the sleep signal, operating the network interface device according to a quiet/refresh cycle of the low power mode to conserve power, the quiet/refresh cycle corresponding to a time schedule that includes a refresh time window in which receive circuitry of the network interface device is to be powered to receive a refresh signal from the link partner to facilitate keeping the receive circuitry of the network interface device synchronized with the link partner, including transitioning, immediately after transmission of the sleep signal, the network interface device to a quiet time window of the time schedule in which the network interface device ignores transmissions from the link partner.

Embodiment 7: The method for power saving of embodiment 6, wherein: the refresh time window is within a last-occurring quiet time window in the time schedule; and the method further comprises: powering the receive circuitry to receive the refresh signal during the refresh time window that is within the last-occurring quiet time window, and ignoring transmissions from the link partner during a remainder of the last-occurring quiet time window after the refresh time window.

Embodiment 8: The method for power saving of embodiment 7, further comprising: controlling, by the network interface device, reception via the communication link according to forward error correction (FEC) frame time periods; wherein the last-occurring quiet time window corresponds to at least four FEC frame time periods, including a first-occurring FEC frame time period, a last-occurring FEC frame time period, and at least two middle-occurring FEC frame time periods; wherein the refresh time window overlaps with at least one of the at least two middle-occurring FEC frame time periods, does not overlap with the first-occurring FEC frame time period, and does not overlap with the last-occurring FEC frame time period; and wherein the method further comprises: powering the receive circuitry during the at least one of the at least two middle-occurring FEC frame time periods to receive the refresh signal, and ignoring, by the network interface device, transmissions from the link partner during last-occurring FEC frame time period.

Embodiment 9: The method for power saving of embodiment 8, wherein: the at least two middle-occurring FEC frame time periods include a second-occurring FEC frame time period and a third-occurring FEC frame time period; the last-occurring FEC frame time period is a fourth-occurring FEC frame time period; the refresh time window overlaps with the third-occurring FEC frame time periods, does not overlap with the second-occurring FEC frame time period, and does not overlap with the fourth-occurring FEC frame time period; and the method further comprises: powering the receive circuitry during the third-occurring FEC frame time period to receive the refresh signal, and ignoring, by the network interface device, transmissions from the link partner during fourth-occurring FEC frame time period.

Embodiment 10: The method for power saving of any of embodiments 6-9, further comprising: controlling, by the network interface device, reception via the communication link according to forward error correction (FEC) superframe time periods, each FEC superframe time period corresponding to a predetermined number of FEC frame time periods; and transitioning, by the network interface device, to the quiet time window at an FEC superframe boundary that coincides with an end of reception of the sleep signal.

Embodiment 11: A network interface device, comprising: physical layer (PHY) circuitry comprising a transceiver, the PHY processor being configured to perform PHY functions associated with a communication link; and a controller. The controller is configured to: operate the PHY circuitry in a normal transmit operating mode in which the PHY circuitry continually transmits transmission symbols to a link partner via the communication link; determine that transmit circuitry of the PHY circuitry is to transition to a low power mode; in response to determining that the transmit circuitry is to transition to the low power mode, transmit a sleep signal to the link partner via the communication link to prompt the link partner to enter the low power mode; and in response to determining that the transmit circuitry is to transition to the low power mode and after transmitting the sleep signal, control the PHY circuitry to operate according to a quiet/refresh cycle to conserve power, the quiet/refresh cycle corresponding to a time schedule that includes a refresh time window in which the PHY circuitry is to transmit a refresh signal to the link partner to facilitate keeping the receive circuitry of the link partner synchronized with the PHY circuitry, including controlling the PHY circuitry to transition, immediately after transmission of the sleep signal, to a quiet time window of the time schedule in which the PHY circuitry quiets transmissions to the link partner.

Embodiment 12: The network device of embodiment 11, wherein: the refresh time window is within a last-occurring quiet time window in the time schedule; and the controller is configured to control the PHY circuitry to transmit the refresh signal during the refresh time window that is within the last-occurring quiet time window.

Embodiment 13: The network device of embodiment 12, wherein: the PHY circuitry is configured to synchronize with the link partner according to forward error correction (FEC) frame time periods; the last-occurring quiet time window corresponds to at least four FEC frame time periods, including a first-occurring FEC frame time period, a last-occurring FEC frame time period, and at least two middle-occurring FEC frame time periods; the refresh time window overlaps with at least one of the at least two middle-occurring FEC frame time periods, does not overlap with the first-occurring FEC frame time period, and does not overlap with the last-occurring FEC frame time period; and the controller is configured to control the PHY circuitry to transmit the refresh signal during the at least one of the at least two middle-occurring FEC frame time periods.

Embodiment 14: The network device of embodiment 13, wherein: the at least two middle-occurring FEC frame time periods include a second-occurring FEC frame time period and a third-occurring FEC frame time period; the last-occurring FEC frame time period is a fourth-occurring FEC frame time period; the refresh time window overlaps with the third-occurring FEC frame time periods, does not overlap with the second-occurring FEC frame time period, and does not overlap with the fourth-occurring FEC frame time period; and the controller is configured to control the PHY circuitry to transmit the refresh signal during the third-occurring FEC frame time period.

Embodiment 15: The network device of any of embodiments 11-14, wherein: the PHY circuitry is configured to synchronize with the link partner according to forward error correction (FEC) superframe time periods, each FEC superframe time period corresponding to a predetermined number of FEC frame time periods; and the controller is configured to control the PHY circuitry to: control the PHY end transmission of the sleep signal at an FEC superframe boundary, and transition to the quiet time window at the FEC superframe boundary.

Embodiment 16: A method for power saving regarding a communication link, the method comprising: operating a network interface device in a normal transmit operating mode in which the network interface device continually transmits transmission symbols to a link partner via the communication link; determining, at the network interface device, that transmit circuitry of the network interface device is to transition to a low power mode; in response to determining that the transmit circuitry is to transition to the low power mode; transmitting, by the network interface device, a sleep signal to the link partner via the communication link to prompt the link partner to enter the low power mode; and in response to determining that the transmit circuitry is to transition to the low power mode and after transmitting the sleep signal, operating the network interface device according to a quiet/refresh cycle to conserve power, the quiet/refresh cycle corresponding to a time schedule that includes a refresh time window in which the network interface device is to transmit a refresh signal to the link partner to facilitate keeping the receive circuitry of the link partner synchronized with the network interface device, including transitioning the network interface device immediately, after transmission of the sleep signal, to a quiet time window of the time schedule in which the transmit circuitry quiets transmissions to the link partner.

Embodiment 17: The method for power saving of embodiment 16, wherein: the refresh time window is within a last-occurring quiet time window in the time schedule; and the method further comprises transmitting, by the network interface device, the refresh signal during the refresh time window that is within the last-occurring quiet time window.

Embodiment 18: The method for power saving of embodiment 17, further comprising: controlling, by the network interface device, transmissions via the communication link according to forward error correction (FEC) frame time periods; wherein the last-occurring quiet time window corresponds to at least four FEC frame time periods, including a first-occurring FEC frame time period, a last-occurring FEC frame time period, and at least two middle-occurring FEC frame time periods; wherein the refresh time window overlaps with at least one of the at least two middle-occurring FEC frame time periods, does not overlap with the first-occurring FEC frame time period, and does not overlap with the last-occurring FEC frame time period; and wherein the method further comprises transmitting, by the network interface device, the refresh signal during the at least one of the at least two middle-occurring FEC frame time periods.

Embodiment 19: The method for power saving of embodiment 18, wherein: the at least two middle-occurring FEC frame time periods include a second-occurring FEC frame time period and a third-occurring FEC frame time period; the last-occurring FEC frame time period is a fourth-occurring FEC frame time period; the refresh time window overlaps with the third-occurring FEC frame time periods, does not overlap with the second-occurring FEC frame time period, and does not overlap with the fourth-occurring FEC frame time period; and the method further comprises transmitting, by the network interface device, the refresh signal during the third-occurring FEC frame time period.

Embodiment 20: The method for power saving of any of embodiments 16-19, further comprising: controlling, by the network interface device, transmissions via the communication link according to forward error correction (FEC) superframe time periods, each FEC superframe time period corresponding to a predetermined number of FEC frame time periods; ending transmission of the sleep signal by the network interface device at an FEC superframe boundary; and transitioning, by the network interface device, to the quiet time window at the FEC superframe boundary.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory coupled to the processor, such as a RAM, a ROM, a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A network interface device, comprising:
   physical layer (PHY) circuitry comprising a transceiver, the PHY circuitry being configured to perform PHY functions associated with a communication link; and
   a controller configured to:
      operate the PHY circuitry in a normal receive operating mode in which the PHY circuitry continually receives transmission symbols from a link partner via the communication link,
      determine that receive circuitry of the PHY circuitry is to transition to a low power mode in response to receiving a sleep signal from the link partner, and
      in response to determining that the receive circuitry is to transition to the low power mode and after receiving the sleep signal, control the PHY circuitry to operate according to a quiet/refresh cycle of the low power mode to conserve power, the quiet/refresh cycle corresponding to a time schedule that includes i) alternating a) quiet time windows in which the PHY circuitry ignores transmissions from the link partner and b) alert time windows in which the PHY circuitry is prepared to receive a wake signal from the link partner, and ii) a refresh time window in which receive circuitry of the PHY circuitry is to be powered to receive a refresh signal from the link partner to facilitate keeping the receive circuitry of PHY circuitry synchronized with the link partner, including controlling the PHY circuitry to transition, immediately after transmission of the sleep signal, to a first-occurring quiet time window of the time schedule.

2. The network device of claim 1, wherein:
   the refresh time window is within a last-occurring quiet time window in the time schedule; and
   the controller is configured to control the PHY circuitry to be powered to receive the refresh signal during the refresh time window that is within the last-occurring quiet time window and to ignore transmissions from the link partner during a remainder of the last-occurring quiet time window after the refresh time window.

3. The network device of claim 2, wherein:
   the PHY circuitry is configured to synchronize with the link partner according to forward error correction (FEC) frame time periods;
   the last-occurring quiet time window corresponds to at least four FEC frame time periods, including a first-occurring FEC frame time period, a last-occurring FEC frame time period, and at least two middle-occurring FEC frame time periods;
   the refresh time window overlaps with at least one of the at least two middle-occurring FEC frame time periods, does not overlap with the first-occurring FEC frame time period, and does not overlap with the last-occurring FEC frame time period; and
   the controller is configured to control the PHY circuitry to:
      be powered to receive the refresh signal during the at least one of the at least two middle-occurring FEC frame time periods, and
      ignore transmissions from the link partner during last-occurring FEC frame time period.

4. The network device of claim 3, wherein:
the at least two middle-occurring FEC frame time periods include a second-occurring FEC frame time period and a third-occurring FEC frame time period;
the last-occurring FEC frame time period is a fourth-occurring FEC frame time period;
the refresh time window overlaps with the third-occurring FEC frame time periods, does not overlap with the second-occurring FEC frame time period, and does not overlap with the fourth-occurring FEC frame time period; and
the controller is configured to control the PHY circuitry to:
power the receive circuitry during the third-occurring FEC frame time period to receive the refresh signal, and
ignore transmissions from the link partner during fourth-occurring FEC frame time period.

5. The network device of claim 1, wherein:
the PHY circuitry is configured to synchronize with the link partner according to forward error correction (FEC) superframe time periods, each FEC superframe time period corresponding to a predetermined number of FEC frame time periods; and
the controller is configured to control the PHY circuitry to transition to the quiet time window at a FEC superframe boundary that coincides with an end of reception of the sleep signal.

6. A method for power saving regarding a communication link, the method comprising:
operating a network interface device in a normal transmit operating mode in which the network interface device continually receives transmission symbols from a link partner via the communication link;
determining, at the network interface device, that receive circuitry of the network interface device is to transition to a low power mode in response to receiving a sleep signal from the link partner;
in response to determining that the receive circuitry is to transition to the low power mode and after receiving the sleep signal, operating the network interface device according to a quiet/refresh cycle of the low power mode to conserve power, the quiet/refresh cycle corresponding to a time schedule that includes i) alternating a) quiet time windows in which the PHY circuitry ignores transmissions from the link partner and b) alert time windows in which the PHY circuitry is prepared to receive a wake signal from the link partner, and i) a refresh time window in which receive circuitry of the network interface device is to be powered to receive a refresh signal from the link partner to facilitate keeping the receive circuitry of the network interface device synchronized with the link partner, including transitioning, immediately after transmission of the sleep signal, the network interface device to a first-occurring quiet time window of the time schedule.

7. The method for power saving of claim 6, wherein:
the refresh time window is within a last-occurring quiet time window in the time schedule; and
the method further comprises:
powering the receive circuitry to receive the refresh signal during the refresh time window that is within the last-occurring quiet time window, and
ignoring transmissions from the link partner during a remainder of the last-occurring quiet time window after the refresh time window.

8. The method for power saving of claim 7, further comprising:
controlling, by the network interface device, reception via the communication link according to forward error correction (FEC) frame time periods;
wherein the last-occurring quiet time window corresponds to at least four FEC frame time periods, including a first-occurring FEC frame time period, a last-occurring FEC frame time period, and at least two middle-occurring FEC frame time periods;
wherein the refresh time window overlaps with at least one of the at least two middle-occurring FEC frame time periods, does not overlap with the first-occurring FEC frame time period, and does not overlap with the last-occurring FEC frame time period; and
wherein the method further comprises:
powering the receive circuitry during the at least one of the at least two middle-occurring FEC frame time periods to receive the refresh signal, and
ignoring, by the network interface device, transmissions from the link partner during last-occurring FEC frame time period.

9. The method for power saving of claim 8, wherein:
the at least two middle-occurring FEC frame time periods include a second-occurring FEC frame time period and a third-occurring FEC frame time period;
the last-occurring FEC frame time period is a fourth-occurring FEC frame time period;
the refresh time window overlaps with the third-occurring FEC frame time periods, does not overlap with the second-occurring FEC frame time period, and does not overlap with the fourth-occurring FEC frame time period; and
the method further comprises:
powering the receive circuitry during the third-occurring FEC frame time period to receive the refresh signal, and
ignoring, by the network interface device, transmissions from the link partner during fourth-occurring FEC frame time period.

10. The method for power saving of claim 6, further comprising:
controlling, by the network interface device, reception via the communication link according to forward error correction (FEC) superframe time periods, each FEC superframe time period corresponding to a predetermined number of FEC frame time periods; and
transitioning, by the network interface device, to the quiet time window at an FEC superframe boundary that coincides with an end of reception of the sleep signal.

11. A network interface device, comprising:
physical layer (PHY) circuitry comprising a transceiver, the PHY circuitry being configured to perform PHY functions associated with a communication link; and
a controller configured to:
operate the PHY circuitry in a normal transmit operating mode in which the PHY circuitry continually transmits transmission symbols to a link partner via the communication link,
determine that transmit circuitry of the PHY circuitry is to transition to a low power mode,
in response to determining that the transmit circuitry is to transition to the low power mode, transmit a sleep signal to the link partner via the communication link to prompt the link partner to enter the low power mode, and in response to determining that the transmit circuitry is to transition to the low power mode and after transmitting the sleep signal, control the PHY circuitry to operate according to a quiet/refresh cycle to conserve power, the quiet/refresh cycle corresponding to a time schedule that includes i) alternating a) quiet time windows in which the PHY circuitry quiets transmissions to the link partner and b) alert time windows in which the PHY circuitry is permitted to transmit a wake signal to the link partner and ii) a refresh time window in which the PHY circuitry is to transmit a refresh signal to the link partner to facilitate keeping the receive circuitry of the link partner synchronized with the PHY circuitry, including controlling the PHY circuitry to transition, immediately after transmission of the sleep signal, to a first-occurring quiet time window of the time schedule.

12. The network device of claim 11, wherein:
the refresh time window is within a last-occurring quiet time window in the time schedule; and
the controller is configured to control the PHY circuitry to transmit the refresh signal during the refresh time window that is within the last-occurring quiet time window.

13. The network device of claim 12, wherein:
the PHY circuitry is configured to synchronize with the link partner according to forward error correction (FEC) frame time periods;
the last-occurring quiet time window corresponds to at least four FEC frame time periods, including a first-occurring FEC frame time period, a last-occurring FEC frame time period, and at least two middle-occurring FEC frame time periods;
the refresh time window overlaps with at least one of the at least two middle-occurring FEC frame time periods, does not overlap with the first-occurring FEC frame time period, and does not overlap with the last-occurring FEC frame time period; and
the controller is configured to control the PHY circuitry to transmit the refresh signal during the at least one of the at least two middle-occurring FEC frame time periods.

14. The network device of claim 13, wherein:
the at least two middle-occurring FEC frame time periods include a second-occurring FEC frame time period and a third-occurring FEC frame time period;
the last-occurring FEC frame time period is a fourth-occurring FEC frame time period;
the refresh time window overlaps with the third-occurring FEC frame time periods, does not overlap with the second-occurring FEC frame time period, and does not overlap with the fourth-occurring FEC frame time period; and
the controller is configured to control the PHY circuitry to transmit the refresh signal during the third-occurring FEC frame time period.

15. The network device of claim 11, wherein:
the PHY circuitry is configured to synchronize with the link partner according to forward error correction (FEC) superframe time periods, each FEC superframe time period corresponding to a predetermined number of FEC frame time periods; and
the controller is configured to control the PHY circuitry to:
control the PHY end transmission of the sleep signal at an FEC superframe boundary, and
transition to the quiet time window at the FEC superframe boundary.

16. A method for power saving regarding a communication link, the method comprising:
operating a network interface device in a normal transmit operating mode in which the network interface device continually transmits transmission symbols to a link partner via the communication link;
determining, at the network interface device, that transmit circuitry of the network interface device is to transition to a low power mode;
in response to determining that the transmit circuitry is to transition to the low power mode; transmitting, by the network interface device, a sleep signal to the link partner via the communication link to prompt the link partner to enter the low power mode; and
in response to determining that the transmit circuitry is to transition to the low power mode and after transmitting the sleep signal, operating the network interface device according to a quiet/refresh cycle to conserve power, the quiet/refresh cycle corresponding to a time schedule that includes i) alternating al quiet time windows in which the PHY circuitry quiets transmissions to the link partner and b) alert time windows in which the PHY circuitry is permitted to transmit a wake signal to the link partner, and ii) a refresh time window in which the network interface device is to transmit a refresh signal to the link partner to facilitate keeping the receive circuitry of the link partner synchronized with the network interface device, including transitioning the network interface device immediately, after transmission of the sleep signal, to a first-occurring quiet time window of the time schedule.

17. The method for power saving of claim 16, wherein:
the refresh time window is within a last-occurring quiet time window in the time schedule; and
the method further comprises transmitting, by the network interface device, the refresh signal during the refresh time window that is within the last-occurring quiet time window.

18. The method for power saving of claim 17, further comprising:
controlling, by the network interface device, transmissions via the communication link according to forward error correction (FEC) frame time periods;
wherein the last-occurring quiet time window corresponds to at least four FEC frame time periods, including a first-occurring FEC frame time period, a last-occurring FEC frame time period, and at least two middle-occurring FEC frame time periods;
wherein the refresh time window overlaps with at least one of the at least two middle-occurring FEC frame time periods, does not overlap with the first-occurring FEC frame time period, and does not overlap with the last-occurring FEC frame time period; and
wherein the method further comprises transmitting, by the network interface device, the refresh signal during the at least one of the at least two middle-occurring FEC frame time periods.

19. The method for power saving of claim 18, wherein:
the at least two middle-occurring FEC frame time periods include a second-occurring FEC frame time period and a third-occurring FEC frame time period;
the last-occurring FEC frame time period is a fourth-occurring FEC frame time period;
the refresh time window overlaps with the third-occurring FEC frame time periods, does not overlap with the second-occurring FEC frame time period, and does not overlap with the fourth-occurring FEC frame time period; and the method further comprises transmitting, by the network interface device, the refresh signal during the third-occurring FEC frame time period.

20. The method for power saving of claim 16, further comprising:

controlling, by the network interface device, transmissions via the communication link according to forward error correction (FEC) superframe time periods, each FEC superframe time period corresponding to a predetermined number of FEC frame time periods;

ending transmission of the sleep signal by the network interface device at an FEC superframe boundary; and transitioning, by the network interface device, to the quiet time window at the FEC superframe boundary.

* * * * *